(12) United States Patent
Wang et al.

(10) Patent No.: US 12,106,434 B2
(45) Date of Patent: Oct. 1, 2024

(54) GENERATION OF THREE DIMENSIONAL GEOLOGICAL MODEL OF GEOGRAPHIC SITE

(71) Applicant: City University of Hong Kong, Kowloon (HK)

(72) Inventors: Yu Wang, Kowloon (HK); Chao Shi, Kowloon (HK)

(73) Assignee: City University of Hong Kong, Kowloon (HK)

( * ) Notice: Subject to any disclaimer, the term of this patent is extended or adjusted under 35 U.S.C. 154(b) by 180 days.

(21) Appl. No.: 17/961,713

(22) Filed: Oct. 7, 2022

(65) Prior Publication Data

US 2023/0343029 A1    Oct. 26, 2023

Related U.S. Application Data

(60) Provisional application No. 63/332,799, filed on Apr. 20, 2022.

(51) Int. Cl.
*G06T 17/05* (2011.01)
*G06F 18/214* (2023.01)
*G06N 20/00* (2019.01)

(52) U.S. Cl.
CPC .......... *G06T 17/05* (2013.01); *G06F 18/2148* (2023.01); *G06N 20/00* (2019.01)

(58) Field of Classification Search
CPC ......... G06T 17/05; G06N 20/00; G06V 10/82
See application file for complete search history.

(56) References Cited

U.S. PATENT DOCUMENTS

| 2002/0099504 A1* | 7/2002 | Cross ..................... G01V 11/00 |
| | | 702/2 |
| 2022/0120176 A1* | 4/2022 | Gutarov ................ E21B 47/024 |

(Continued)

FOREIGN PATENT DOCUMENTS

CN         113906465 A  *  1/2022  ......... G06F 16/2365
WO     WO-2018201180 A1 *  11/2018

OTHER PUBLICATIONS

Lin, B., Zhou, L., Lv, G., & Zhu, A. X. (2017). 3D geological modelling based on 2D geological map. Annals of GIS, 23(2), 117-129. https://doi.org/10.1080/19475683.2017.1304450 (Year: 2017).*

(Continued)

*Primary Examiner* — Grace Q Li
(74) *Attorney, Agent, or Firm* — Renner, Kenner, Greive, Bobak, Taylor & Weber

(57) ABSTRACT

A computer-implemented method for generating a 3D geological model of a subsurface volume of a geographic site. The method includes processing, based on a machine-learning-based model, borehole data of a plurality of boreholes at the geographic site and trusted geological data associated with the geographic site, so as to generate a plurality of geological cross-sections of the subsurface volume of the geographic site. The borehole data includes data related to subsurface soil and/or rock information along at least part of each of the plurality of boreholes. The trusted geological data includes data related to prior stratigraphic information associated with the geographic site. Each of the geological cross-sections contains respective stratigraphic information. The method also includes forming the 3D geological model based on the generated geological cross-sections for display.

20 Claims, 26 Drawing Sheets

(56) References Cited

U.S. PATENT DOCUMENTS

2022/0235654 A1* 7/2022 Stewart .................. G06F 17/18
2024/0037819 A1* 2/2024 Fuchey ................. G06T 11/001

OTHER PUBLICATIONS

English translation of CN 113906465 A (Year: 2017).*
English translation of WO 2018201180 A1 (Year: 2018).*
Webster, R. and Oliver, M.A., 2007. Chapter 4—Characterizing Spatial Processes: The Covariance and Variogram, Geostatistics for environmental scientists (pp. 47-76). John Wiley & Sons.
Wellmann, F. and Caumon, G., 2018. 3-D Structural geological models: Concepts, methods, and uncertainties. In Advances in Geophysics (vol. 59, pp. 1-121). Elsevier.
Yakowitz, S.J. and Szidarovszky, F., 1985. A comparison of kriging with nonparametric regression methods. Journal of Multivariate Analysis, 16(1), pp. 21-53.
Zhang, T., 2008. Incorporating geological conceptual models and interpretations into reservoir modeling using multiple-point geostatistics. Earth Science Frontiers, 15(1), pp. 26-35.
Carle, S.F., Labolle, E.M., Weissmann, G.S., Van Brocklin, D., and Fogg, G.E. 1998. Conditional simulation of hydrofacies architecture: A transition probability/markov approach, Hydrogeologic models of sedimentary aquifers, concepts in hydrogeology and environmental geology, 1: 147-170.
Deng, Z.P., Jiang, S.H., Niu, J.T., Pan, M. and Liu, L.L., 2020. Stratigraphic uncertainty characterization using generalized coupled Markov chain. Bulletin of Engineering Geology and the Environment, 79(10), pp. 5061-5078.
Deutsch, C.V. and Journel, A.G. 1992. Chapter 4—Kriging, Geostatistical software library and user's guide, New York, 119(147), pp. 63-118.
Dell'Arciprete, D., Bersezio, R., Felletti, F., Giudici, M., Comunian, A., and Renard, p. 2012. Comparison of three geostatistical methods for hydrofacies simulation: A test on alluvial sediments, Hydrogeology Journal, 20(2): 299-311.
Goodfellow, I., Bengio, Y. and Courville, A., 2016. Chapter 6—Deep Deedforward Networks, Deep learning (pp. 168-227). MIT press.
Guardiano, F.B. and Srivastava, R.M., 1993. Multivariate geostatistics: beyond bivariate moments. In Geostatistics Troia'92 (pp. 133-144). Springer, Dordrecht.
Jia, R., Lv, Y., Wang, G., Carranza, E., Chen, Y., Wei, C. and Zhang, Z., 2021. A stacking methodology of machine learning for 3D geological modeling with geological-geophysical datasets, Laochang Sn camp, Gejiu (China). Computers & Geosciences, 151, p. 104754.
Lawrence, S., Giles, C.L. and Tsoi, A.C., Jul. 1997. Lessons in neural network training: Overfitting may be harder than expected. In AAAI/IAAI (pp. 540-545).
Mariethoz, G. and Caers, J., 2014. Chapter 2—The algorithmic building blocks, Multiple-point geostatistics: stochastic modeling with training images (pp. 87-154). John Wiley & Sons.
Qi, X.H., Li, D.Q., Phoon, K.K., Cao, Z.J. and Tang, X.S., 2016. Simulation of geologic uncertainty using coupled Markov chain. Engineering geology, 207, pp. 129-140.
Shi, C. and Wang, Y., 2021a. Nonparametric and data-driven interpolation of subsurface soil stratigraphy from limited data using multiple point statistics. Canadian Geotechnical Journal, 58(2), pp. 261-280.
Shi, C. and Wang, Y. 2021b. Smart determination of borehole number and locations for stability analysis of multi-layered slopes using multiple point statistics and information entropy. Canadian Geotechnical Journal, 58(11), 1669-1689.
Strebelle, S. 2000. Sequential simulation drawing structures from training images. Ph. D. thesis, Stanford University, 374 pages.
Tahmasebi, P., 2018. Chapter 30 - Multiple Point Statistics: A Review. In Handbook of Mathematical Geosciences (pp. 613-643). Springer, Cham.
Wang, H., Wellmann, J.F., Li, Z., Wang, X., and Liang, R.Y. 2017. A segmentation approach for stochastic geological modeling using hidden markov random fields, Mathematical Geosciences, 49(2): 145-177.
Wang, X., 2020. Uncertainty quantification and reduction in the characterization of subsurface stratigraphy using limited geotechnical investigation data. Underground Space, 5(2), pp. 125-143.
Wu, S., Zhang, J.M. and Wang, R., 2021. Machine learning method for CPTu based 3D stratification of New Zealand geotechnical database sites. Advanced Engineering Informatics, 50, p. 101397.
Zhao, C., Gong, W., Li, T., Juang, C.H., Tang, H. and Wang, H., 2021. Probabilistic characterization of subsurface stratigraphic configuration with modified random field approach. Engineering Geology, 288, p. 106138.
Zhang, T., Switzer, P., and Journel, A. 2006. Filter-based classification of training image patterns for spatial simulation. Mathematical Geology, 38(1): 63-80.
Zhou, C., Ouyang, J., Ming, W., Zhang, G., Du, Z. and Liu, Z., 2019. A stratigraphic prediction method based on machine learning. Applied Sciences, 9(17), p. 3553.
Alipour, A. and Eslami, A., 2019. Design adaptations in a large and deep urban excavation: Case study. Journal of Rock Mechanics and Geotechnical Engineering, 11(2), pp. 389-399.
Boisvert, J.B., Pyrcz, M.J. and Deutsch, C.V., 2007. Multiple-point statistics for training image selection. Natural Resources Research, 16(4), pp. 313-321.
Caers, J., 2004. Chapter 2—Modeling Geological Continuity, Petroleum geostatistics. Richardson: Society of Petroleum Engineers.
Caers, J., 2006. A general algorithm for building 3D spatial laws from lower dimensional structural information. 19th Annual Report, Stanford Center for Reservoir Forecasting, Stanford University, CA.
Caers, J., 2011. Chapter 6—Modeling Spatial Uncertainty, Modeling uncertainty in the earth sciences (pp. 93-106). John Wiley & Sons.
Comunian, A., Renard, P., and Straubhaar, J. 2012. 3D multiple-point statistics simulation using 2D training images, Computers & Geosciences, 40: 49-65.
Crisp, M.P., Jaksa, M.B., Kuo, Y.L., Fenton, G.A. and Griffiths, D.V., 2019. A method for generating virtual soil profiles with complex, multi-layer stratigraphy. Georisk: Assessment and Management of Risk for Engineered Systems and Geohazards, 13(2), pp. 154-163.
Dai, F.C. and Lee, C.F., 2002. Landslide characteristics and slope instability modeling using GIS, Lantau Island, Hong Kong. Geomorphology, 42(3-4), pp. 213-228.
Deutsch, C.V. and Wang, L., 1996. Hierarchical object-based stochastic modeling of fluvial reservoirs. Mathematical geology, 28(7), pp. 857-880.
El Saddik A. Digital twins: The convergence of multimedia technologies. IEEE multimedia. Aug. 3, 2018;25(2):87-92.
Elfeki, A. and Dekking, M., 2001. A Markov chain model for subsurface characterization: theory and applications. Mathematical geology, 33(5), pp. 569-589.
Geo, 1987. Guide to site investigation. Geotechnical engineering office, Civil Engineering and Development Department, Hong Kong.
Goh, A.T.C., Zhang, R.H., Wang, W., Wang, L., Liu, H.L. and Zhang, W.G., 2020. Numerical study of the effects of groundwater drawdown on ground settlement for excavation in residual soils. Acta Geotechnica, 15(5), pp. 1259-1272.
Heim, G.E. 1990. Knowledge of the origin of soil deposits is of primary importance to understanding the nature of the deposit. Bulletin of the Association of Engineering Geologists, 27(1): 109-112.
Hansen, T.M. and Bach, T., 2016. MPSLIB: a C++ class for sequential simulation of multiple-point statistical models. SoftwareX, 5, pp. 127-133.
Hastie, T., Tibshirani, R., Friedman, J.H. and Friedman, J.H., 2009. Chapter 11—Neural Networks, The elements of statistical learning: data mining, inference, and prediction (vol. 2, pp. 389-416). New York: springer.
Hu, Y., Wang, Y., Zhao, T. and Phoon, K.K., 2020. Bayesian supervised learning of site-specific geotechnical spatial variability

(56) References Cited

OTHER PUBLICATIONS from sparse measurements. ASCE-ASME Journal of Risk and Uncertainty in Engineering Systems, Part A: Civil Engineering, 6(2), p. 04020019.

Juang, C.H., Ge, Y. and Zhang, J., 2019. Geological Uncertainty: A Missing Element in Geotechnical Reliability Analysis. In 7th International Symposium on Geotechnical Safety and Risk. Research Publishing Taipei, Taiwan.

Klise, K.A., Weissmann, G.S., McKenna, S.A., Nichols, E.M., Frechette, J.D., Wawrzyniec, T.F., and Tidwell, V.C. 2009. Exploring solute transport and streamline connectivity using lidar—based outcrop images and geostatistical representations of heterogeneity, Water Resources Research, 45(5).

Li, D.Q., Qi, X.H., Cao, Z.J., Tang, X.S., Phoon, K.K. and Zhou, C.B., 2016a. Evaluating slope stability uncertainty using coupled Markov chain. Computers and Geotechnics, 73, pp. 72-82.

Li, Z., Wang, X., Wang, H. and Liang, R.Y., 2016b. Quantifying stratigraphic uncertainties by stochastic simulation techniques based on Markov random field. Engineering geology, 201, pp. 106-122.

Mariethoz, G., and Renard, P. 2010. Reconstruction of incomplete data sets or images using direct sampling. Mathematical Geosciences, 42(3): 245-268.

Mood, A.M. 1940. The distribution theory of runs, the Annals of Mathematical Statistics, 11(4): 737 367-392.

Phoon, K.K., Ching, J. and Shuku, T., 2021. Challenges in data-driven site characterization. Georisk: Assessment and Management of Risk for Engineered Systems and Geohazards, pp. 1-13.

Ruohomaki, T., Airaksinen, E., Huuska, P., Kesaniemi, O., Martikka, M. and Suomisto, J., 2018, September. Smart city platform enabling digital twin. In 2018 International Conference on Intelligent Systems (IS) (pp. 155-161). IEEE.

Seber, G.A. and Lee, A.J., 2012. Chapter 3—Linear regression: Estimation and Distribution Theory, Linear regression analysis (vol. 329, pp. 35-95). John Wiley & Sons.

Shi, C. and Wang, Y. 2021c. Development of subsurface geological cross-section from limited site-specific boreholes and prior geological knowledge using iterative convolution XGBoost. Journal of Geotechnical and Geoenvironmental Engineering, 147(9), 04021082.

Shi, C. and Wang, Y., 2021d. Training image selection for development of subsurface geological cross-section by conditional simulations. Engineering Geology, 295, p. 106415.

Shi, C. and Wang, Y., 2021e. Assessment of Reclamation-induced Consolidation Settlement Considering Stratigraphic Uncertainty and Spatial Variability of Soil Properties. Canadian Geotechnical Journal, https://doi.org/10.1139/cgj-2021-0349.

Wang, Y., Shi, C. and Li, X., 2021. Machine learning of geological details from borehole logs for development of high-resolution subsurface geological cross-section and geotechnical analysis. Georisk: Assessment and Management of Risk for Engineered Systems and Geohazards, pp. 1-19.

\* cited by examiner

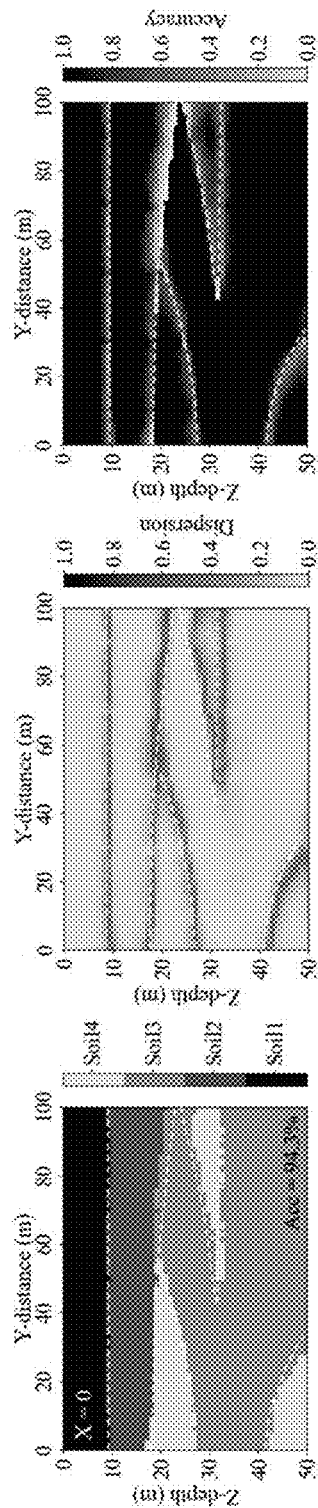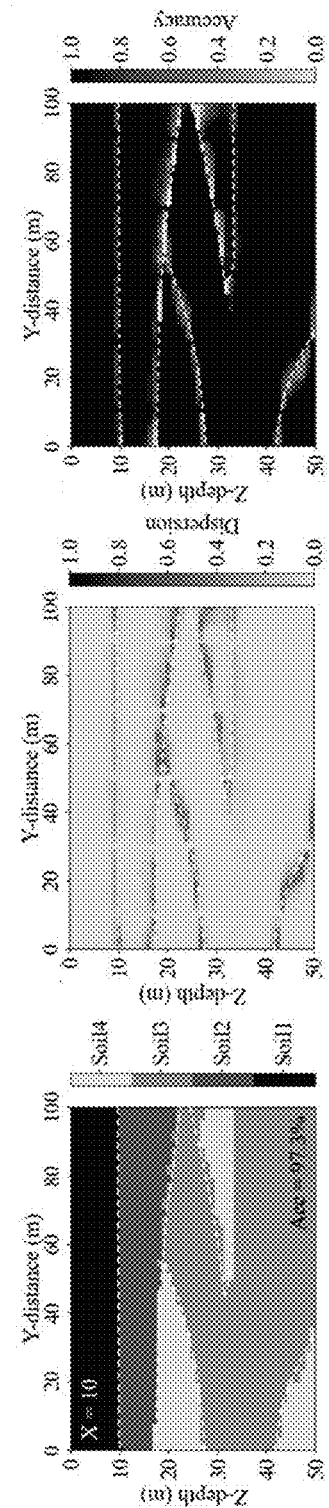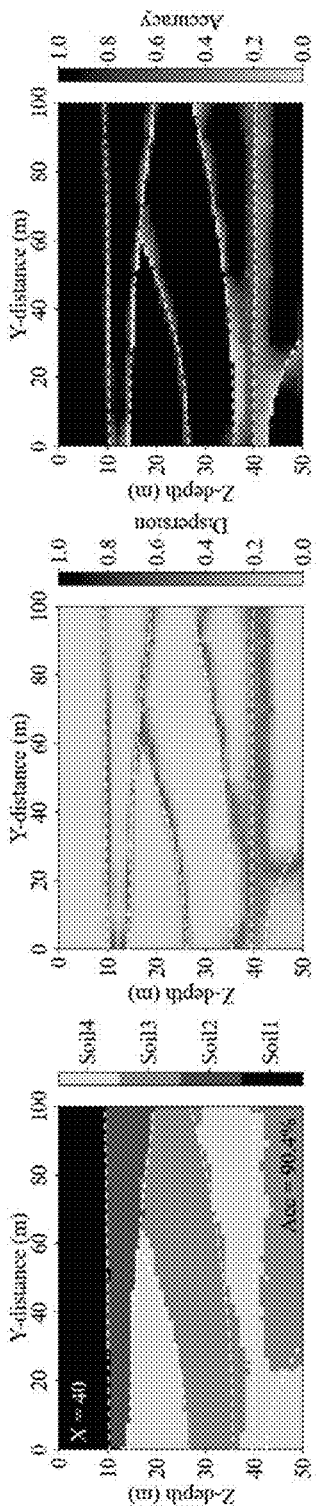
Figure 9A Figure 9B Figure 9C Figure 9D Figure 9E Figure 9F Figure 9G Figure 9H Figure 9I

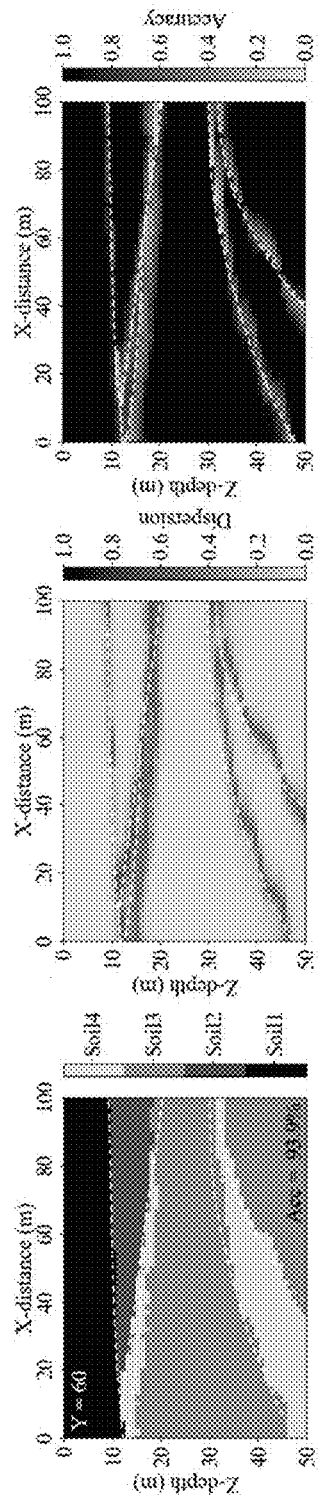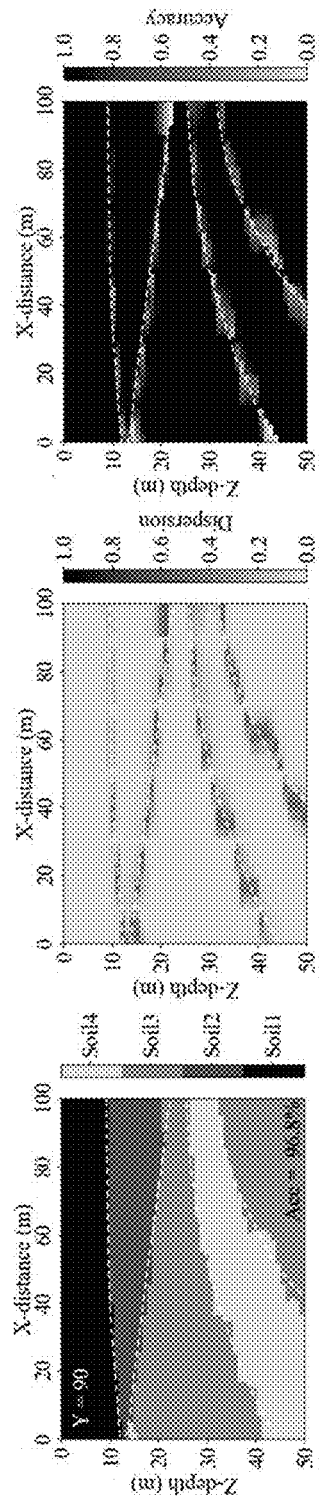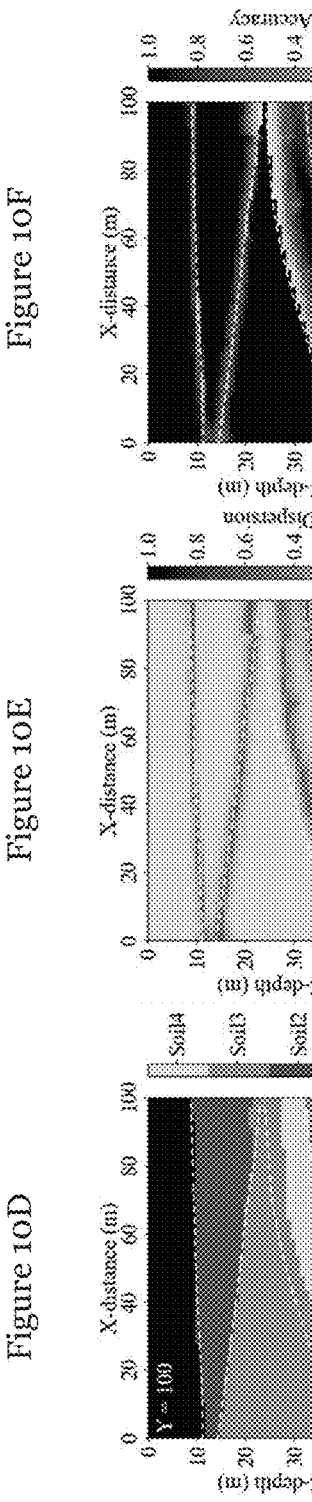

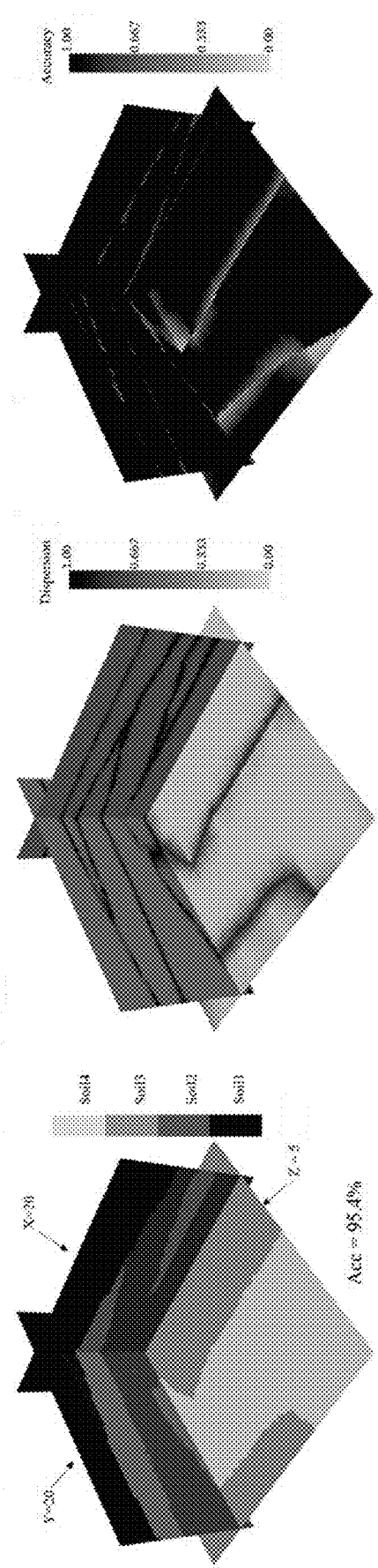
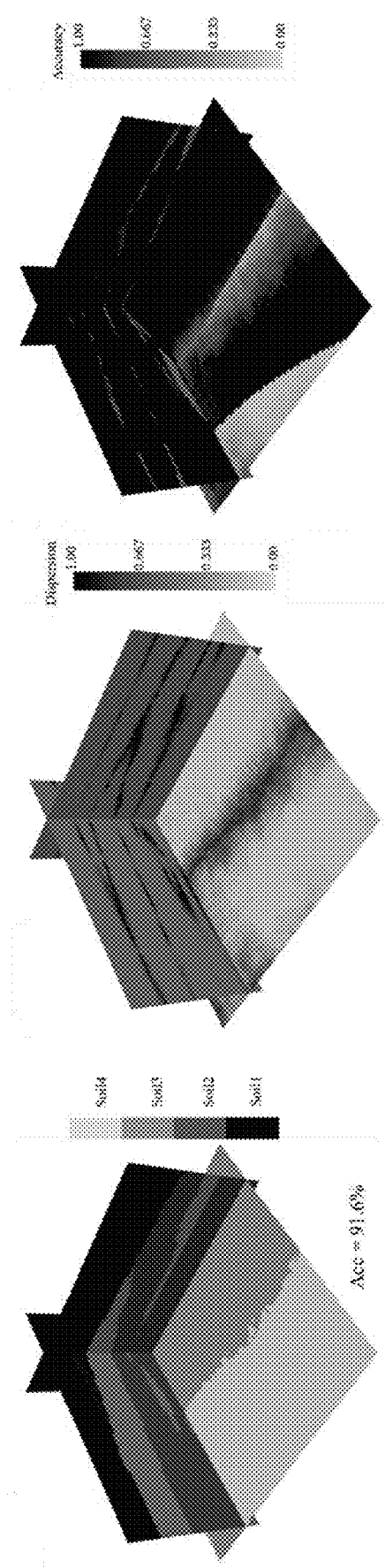
Figure 12A Figure 12B Figure 12C
Figure 12D Figure 12E Figure 12F

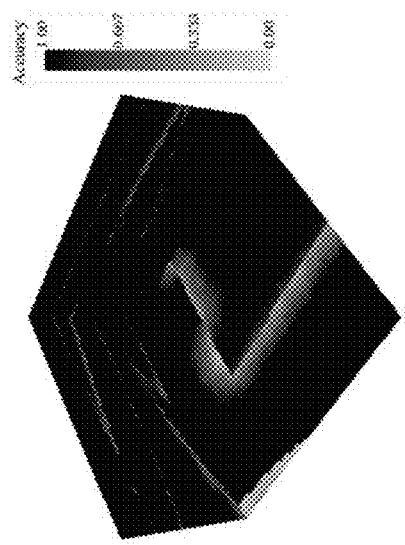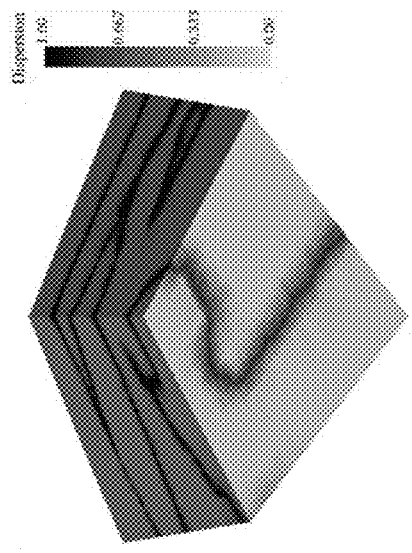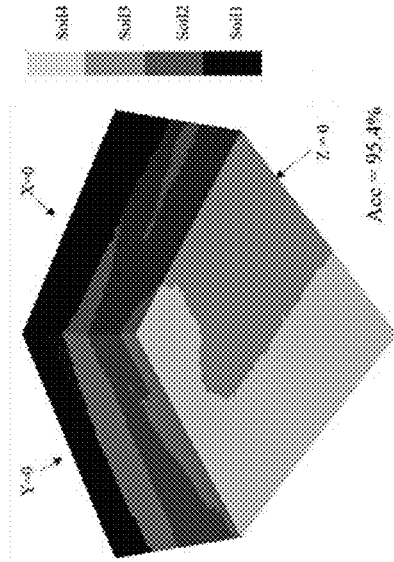
Figure 13A  Figure 13B  Figure 13C
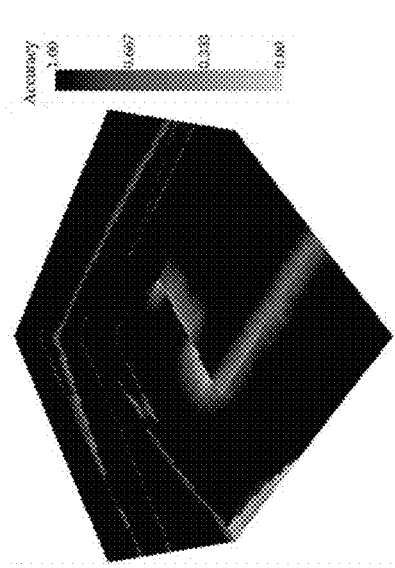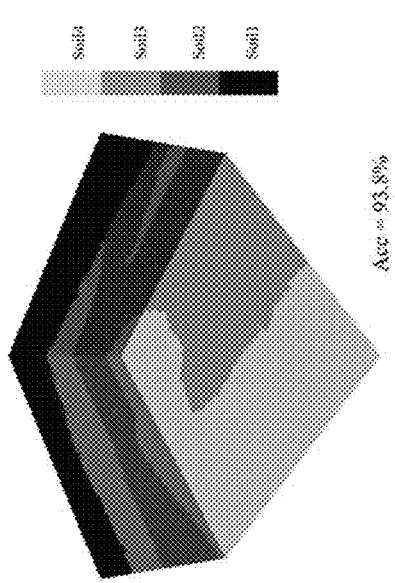
Figure 13D  Figure 13E  Figure 13F

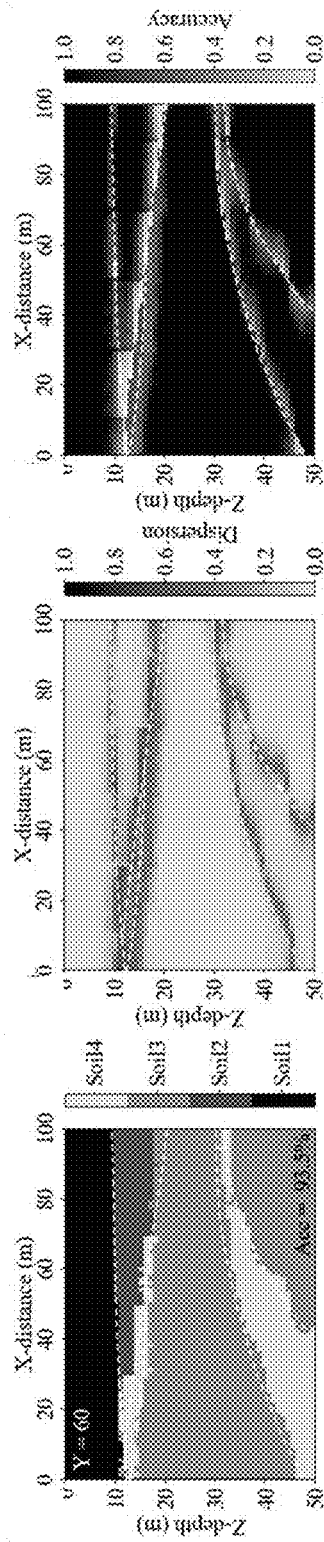
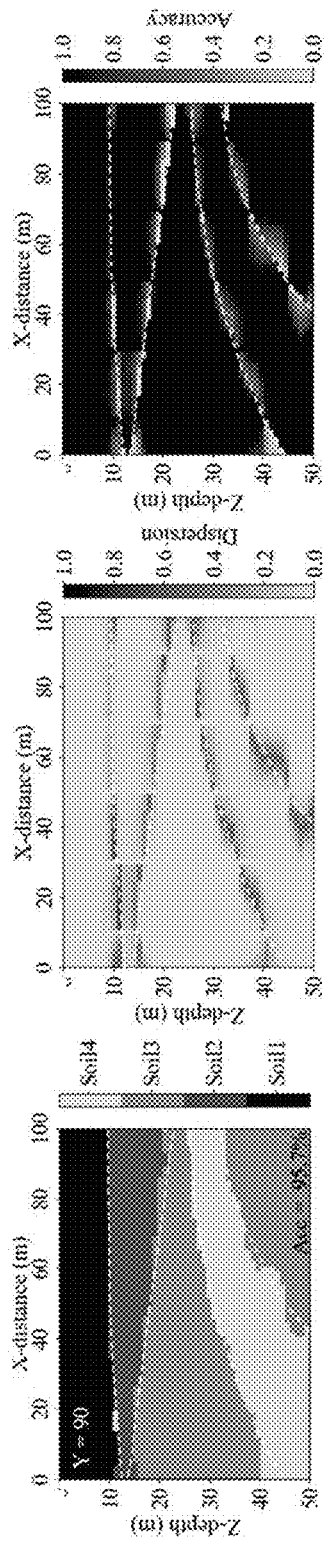
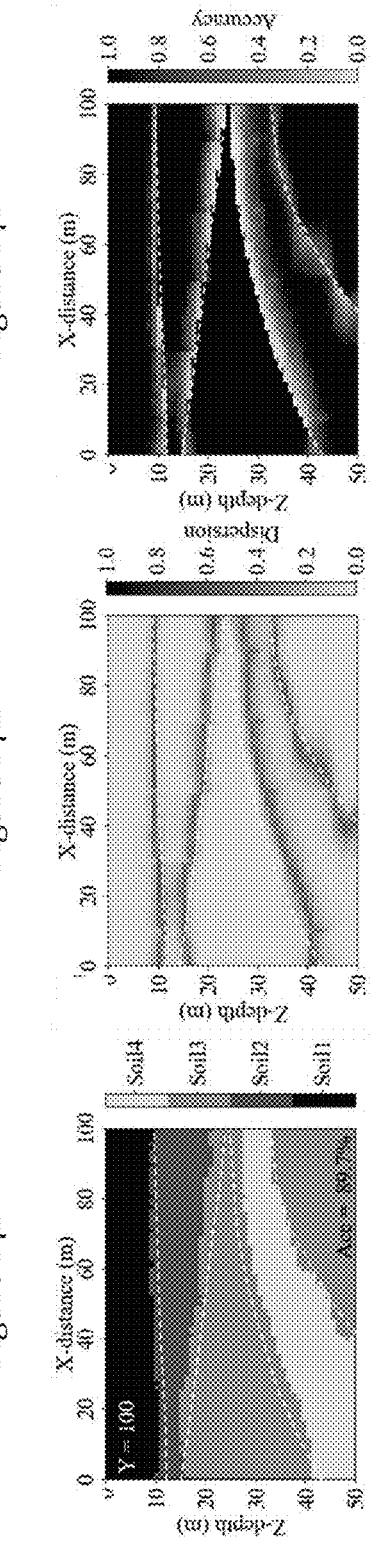
Figure 14A, Figure 14B, Figure 14C, Figure 14D, Figure 14E, Figure 14F, Figure 14G, Figure 14H, Figure 14I

GENERATION OF THREE DIMENSIONAL GEOLOGICAL MODEL OF GEOGRAPHIC SITE

CROSS-REFERENCE TO RELATED APPLICATION

This application claims priority to U.S. Provisional Patent Application No. 63/332,799 filed on 20 Apr. 2022, the entire content of which is incorporated herein by reference.

TECHNICAL FIELD

This invention relates to computer-implemented 3D geological modelling.

BACKGROUND

In geoscience, an underground three dimensional (3D) digital twin includes a virtual/digital representation of subsurface stratigraphy of a geographic site in the real world. Such an underground 3D digital twin can be used, e.g., to facilitate design, construction, performance monitoring, and/or maintenance of underground infrastructures at the geographic site.

The creation of an underground 3D digital twin, in particular the 3D modelling of subsurface stratigraphy of a geographic site, is often challenging. This is because usually only a limited amount of subsurface stratigraphy data of the geographic site is available (e.g., only a small portion of the underground space of the geographic site has been investigated or measured), and there lacks a reliable tool that can accurately and computationally-efficiently determine or infer the missing subsurface stratigraphy data from the limited amount of available data.

SUMMARY OF THE INVENTION

The invention provides a computer-implemented tool (system, method, and the like) for use in 3D geological modelling. The invention can enable or facilitate computationally-efficient and accurate 3D geological modelling. The invention is inextricably linked to a computer/processor environment.

In a first aspect, there is provided a computer-implemented method for generating a 3D geological model of a subsurface volume of a geographic site. The method includes: processing, based on a machine-learning-based model, borehole data of a plurality of boreholes at the geographic site and trusted geological data associated with the geographic site, so as to generate a plurality of geological cross-sections of the subsurface volume of the geographic site. The borehole data includes data related to subsurface soil and/or rock information (e.g., types of subsurface soil and/or rock) along at least part of each of the plurality of boreholes. The trusted geological data includes data related to prior stratigraphic information associated with the geographic site. Each of the geological cross-sections contain respective stratigraphic information. The method also includes forming the 3D geological model based on the generated geological cross-sections for display. The trusted geological data represents prior geological knowledge associated with the geographic site. The 3D geological model may correspond to an underground digital twin of the geographic site.

Optionally, the data related to prior stratigraphic information associated with the geographic site comprises data related to prior stratigraphic information of another site nearby the geographic site and/or another site that is geologically-similar to the geographic site.

Optionally, the data related to prior stratigraphic information associated with the geographic site comprises data related to stratigraphic pattern associated with the geographic site.

Optionally, the stratigraphic information of each of the geological cross-sections comprises respective stratigraphic patterns (e.g., along respective direction(s)).

Optionally, the data related to prior stratigraphic information associated with the geographic site is representable as one or more (e.g., only one, only two, etc.) 2D images of stratigraphic pattern associated with the geographic site.

Optionally, the machine-learning-based model is trained based on the one or more 2D images.

Optionally, the machine-learning-based model comprises an artificial neural network such as a convolutional neural network. Optionally, the machine-learning-based model comprises a multilayer perceptron. Optionally, the machine-learning-based model comprises a gradient boosting based algorithm (i.e., an algorithm based on gradient boosting technique or its variant).

Optionally, the processing comprises: applying the borehole data and the trusted geological data to a 3D coordinate system, and sequentially processing a plurality of slices for the subsurface volume in the 3D coordinate system based on the machine-learning-based model, to consecutively generate the plurality of geological cross-sections.

In some embodiments of the first aspect, the one or more 2D images consist of (only) a single 2D image. Optionally, in these embodiments, applying the borehole data and the trusted geological data to a 3D coordinate system comprises: arranging the borehole data along a depth (e.g., vertical) direction in the 3D coordinate system; and arranging the single 2D image to extend along the depth (e.g., vertical) direction in the 3D coordinate system.

In some embodiments of the first aspect, the one or more 2D images comprise (or alternatively, consists of) two 2D images. Optionally, in these embodiments, applying the borehole data and the trusted geological data to a 3D coordinate system comprises: arranging the borehole data along a depth (e.g., vertical) direction in the 3D coordinate system; and arranging the two 2D images such that they both extend along the depth (e.g., vertical) direction in the 3D coordinate system and such that respective imaginary planes containing the two 2D images define a dihedral angle in the 3D coordinate system. The dihedral angle is larger than o degrees and below 180 degrees, e.g., at about 90 degrees.

Optionally, the plurality of slices comprises: a first plurality of slices arranged generally in parallel with each other and with one of the two 2D images, and a second plurality of slices arranged generally in parallel with each other and with another one of the two 2D images. The first plurality of slices are not arranged parallel to the second plurality of slices. The first plurality of slices and the second plurality of slices may include the same number of slices or different numbers of slices.

Optionally, the processing further comprises: identifying a slice containing the largest amount of borehole data. Optionally, the sequentially processing comprises: initially processing the slice containing the largest amount of borehole data based on the machine-learning-based model; then, (i) if the slice first processed is one of the first plurality of slices, alternately processing one second plurality of slices and one first plurality of slices based on the machine-learning-based model until all of the slices are processed;

and (ii) if the slice first processed is one of the second plurality of slices, alternately processing one first plurality of slices and one second plurality of slices based on the machine-learning-based model until all of the slices are processed.

Optionally, the generated geological cross-section of a processed slice is used as additional borehole data in the processing of the next slice.

Optionally, the sequentially processing comprises: first processing the slice containing the largest amount of borehole data; then sequentially processing the remaining slices in the order of decreasing amount of borehole data and additional borehole data contained in the slices, until all the slices have been processed. Optionally, the sequentially processing further comprises: if two or more of the remaining slices contain the same amount of borehole data and additional borehole data, randomly selecting one of the two or more slices for processing.

Optionally, the processing of each of the plurality of slices comprises, for each slice: performing an extrapolation operation based on the machine-learning-based model to determine stratigraphic information for a boundary of the slice if no borehole data is present along a boundary of the slice; and performing an interpolation operation based on the machine-learning-based model to determine stratigraphic information for other parts of the slice with no borehole data.

Optionally, the performing of the extrapolation operation comprises: determining a template based on the borehole data contained in the slice, the template including a plurality of spaced-apart columns of cells parallel to the depth direction, the columns including a first column along a set of borehole data, a second column along another set of borehole data, and a third column along the boundary without borehole data for extrapolation (to extrapolate borehole data to the third column); applying the template to the 2D image parallel to the slice to extract stratigraphic relationships and/or statistics; training the machine-learning-based model using the extracted stratigraphic relationships and/or statistics; and applying the template to the slice along one or more paths to iteratively process the slice based on the trained machine-learning-based model to determine stratigraphic information for the boundary.

Optionally, the performing of the interpolation operation comprises: determining a plurality of templates based on the borehole data contained in the slice, each of the templates including respective plurality of spaced-apart columns of cells parallel to the depth direction, the columns including a respective first column along a respective set of borehole data, a respective second column along another respective set of borehole data, and a third column in a space between the first and second columns and without borehole data for interpolation (to interpolate borehole data to the third column); applying the templates to the 2D image parallel to the slice to extract stratigraphic relationships and/or statistics; training the machine-learning-based model using the extracted stratigraphic relationships and/or statistics; and applying the templates to the slice along one or more paths to iteratively process the slice based on the trained machine-learning-based model to determine stratigraphic information for other parts of the slice with no borehole data.

Optionally, the forming of the 3D geological model comprises assembling the generated geological cross-sections.

Optionally, the 3D geological model has a spatial resolution of 1 m$^3$ or less.

Optionally, the 3D geological model comprises a 3D point cloud, each point in the 3D point cloud containing subsurface soil and/or rock information (e.g., types of subsurface soil and/or rock) modelled as a categorical variable. Each point in the 3D point cloud may correspond to a voxel.

Optionally, the computer-implemented method further comprises quantifying stratigraphic uncertainty associated with the 3D model.

Optionally, quantifying stratigraphic uncertainty associated with the 3D model comprises: for each point in the 3D point cloud, determining a value indicative of a confidence level associated with the subsurface soil and/or rock information contained in the point.

Optionally, quantifying stratigraphic uncertainty associated with the 3D model comprises: performing statistical analysis of multiple equiprobable 3D geological realizations generated based on Monte Carlo simulation.

Optionally, the computer-implemented method further comprises displaying the 3D geological model and/or a map of the quantified stratigraphic uncertainty.

Optionally, the computer-implemented method further comprises: obtaining new borehole data of a plurality of boreholes at the geographic site and/or new trusted geological data associated with the geographic site; and after obtaining the new borehole data and/or the new data, automatically perform the following: processing, based on the machine-learning-based model, the borehole data, the trusted geological data, and at least one of the new borehole data and the new trusted geological data, to generate a plurality of updated geological cross-sections of the subsurface volume each containing respective stratigraphic information (e.g., pattern) associated with the geographic site. The computer-implemented method further comprises forming an updated 3D geological model based on the generated updated geological cross-sections.

Optionally, the computer-implemented method further comprises: detecting availability of new borehole data and/or new trusted geological data; and upon detecting new borehole data and/or new trusted geological data is available, automatically obtaining the new borehole data and/or the new trusted geological data. Optionally, the detection is performed according to a predetermined schedule (e.g., regularly). Optionally, the detection is performed continuously.

In a second aspect, there is provided a computer-readable medium, such as a non-transitory computer-readable storage medium, storing one or more programs configured to be executed by one or more processors, the one or more programs including instructions for performing or facilitating performing of the method of the first aspect.

In a third aspect, there is provided a system for generating a 3D geological model of a subsurface volume of a geographic site. The system comprises one or more processors and memory storing one or more programs configured to be executed by the one or more processors. The one or more programs include instructions for performing or facilitating performing of the method of the first aspect. The system may further include one or more display operably coupled with the one or more processors for displaying the 3D geological model and/or a map of the quantified stratigraphic uncertainty.

In a fourth aspect, there is provided a computer-implemented method of operating a computer-implemented geographic information platform, comprising: receiving a request to generate a 3D geological model of a geographic site; in response to the request, performing the method of the first aspect; and outputting the 3D geological model of a subsurface volume of the geographic site for display.

In a fifth aspect, there is provided a computer-readable medium, such as a non-transitory computer-readable storage medium, storing one or more programs configured to be executed by one or more processors, the one or more programs including instructions for performing or facilitating performing of the method of the fourth aspect.

In a sixth aspect, there is provided a computer-implemented geographic information platform comprising one or more processors and memory storing one or more programs configured to be executed by the one or more processors. The one or more programs include instructions for performing or facilitating performing of the method of the fourth aspect. The computer-implemented geographic information platform may be implemented using hardware and software.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical conditions, etc.

BRIEF DESCRIPTION OF THE DRAWINGS

Embodiments of the invention will now be described, by way of example, with reference to the accompanying drawings in which:

FIG. 9A is a graph showing the most probable prediction at a selected slice (X=0) of the most probable 3D geological model of FIG. 7A;

FIG. 9B is a graph showing the dispersion plot at the selected slice (X=0) of the most probable 3D geological model of FIG. 7A;

FIG. 9C is a graph showing the accuracy plot at the selected slice (X=0) of the most probable 3D geological model of FIG. 7A;

FIG. 9D is a graph showing the most probable prediction at a selected slice (X=10) of the most probable 3D geological model of FIG. 7A;

FIG. 9E is a graph showing the dispersion plot at the selected slice (X=10) of the most probable 3D geological model of FIG. 7A;

FIG. 9F is a graph showing the accuracy plot at the selected slice (X=10) of the most probable 3D geological model of FIG. 7A;

FIG. 9G is a graph showing the most probable prediction at a selected slice (X=40) of the most probable 3D geological model of FIG. 7A;

FIG. 9H is a graph showing the dispersion plot at the selected slice (X=40) of the most probable 3D geological model of FIG. 7A;

FIG. 9I is a graph showing the accuracy plot at the selected slice (X=4) of the most probable 3D geological model of FIG. 7A;

FIG. 10A is a graph showing the most probable prediction at a selected slice (Y=60) of the most probable 3D geological model of FIG. 7A;

FIG. 10B is a graph showing the dispersion plot at the selected slice (Y=60) of the most probable 3D geological model of FIG. 7A;

FIG. 10C is a graph showing the accuracy plot at the selected slice (Y=60) of the most probable 3D geological model of FIG. 7A;

FIG. 10D is a graph showing the most probable prediction at a selected slice (Y=90) of the most probable 3D geological model of FIG. 7A;

FIG. 10E is a graph showing the dispersion plot at the selected slice (Y=90) of the most probable 3D geological model of FIG. 7A;

FIG. 10F is a graph showing the accuracy plot at the selected slice (Y=90) of the most probable 3D geological model of FIG. 7A;

FIG. 10G is a graph showing the most probable prediction at a selected slice (Y=100) of the most probable 3D geological model of FIG. 7A;

FIG. 10H is a graph showing the dispersion plot at the selected slice (Y=100) of the most probable 3D geological model of FIG. 7A;

FIG. 10I is a graph showing the accuracy plot at the selected slice (Y=100) of the most probable 3D geological model of FIG. 7A;

FIG. 12A is a plot illustrating the most probable prediction of three selected slices (X=20, Y=20 and Z=5) when the boreholes are of equal spacing in one embodiment of the invention;

FIG. 12B is a plot illustrating the dispersion of three selected slices (X=20, Y=20 and Z=5) when the boreholes are of equal spacing in one embodiment of the invention;

FIG. 12C is a plot illustrating the accuracy of three selected slices (X=20, Y=20 and Z=5) when the boreholes are of equal spacing in one embodiment of the invention;

FIG. 12D is a plot illustrating the most probable prediction of three selected slices (X=20, Y=20 and Z=5) when the boreholes are of unequal spacing in one embodiment of the invention;

FIG. 12E is a plot illustrating the dispersion of three selected slices (X=20, Y=20 and Z=5) when the boreholes are of unequal spacing in one embodiment of the invention;

FIG. 12F is a plot illustrating the accuracy of three selected slices (X=20, Y=20 and Z=5) when the boreholes are of unequal spacing in one embodiment of the invention;

FIG. 13A is a plot illustrating the most probable prediction of three selected slices (X=0, Y=0 and Z=0) when two training images (X=50, Y=50) are used in one embodiment of the invention;

FIG. 13B is a plot illustrating the dispersion of three selected slices (X=0, Y=0 and Z=0) when two training images (X=50, Y=50) are used in one embodiment of the invention;

FIG. 13C is a plot illustrating the accuracy of three selected slices (X=0, Y=0 and Z=0) when two training images (X=50, Y=50) are used in one embodiment of the invention;

FIG. 13D is a plot illustrating the most probable prediction of three selected slices (X=0, Y=0 and Z=0) when one training image (X=50) is used in one embodiment of the invention;

FIG. 13E is a plot illustrating the dispersion of three selected slices (X=0, Y=0 and Z=0) when one training image (X=50) is used in one embodiment of the invention;

FIG. 13F is a plot illustrating the accuracy of three selected slices (X=0, Y=0 and Z=0) when one training image (X=50) is used in one embodiment of the invention;

FIG. 14A is a graph showing the most probable prediction at a selected slice (Y=60) of the most probable 3D geological model obtained using a single training image (X=50) in one embodiment of the invention;

FIG. 14B is a graph showing the dispersion plot at the selected slice (Y=60) of the most probable 3D geological model obtained using a single training image (X=50) in one embodiment of the invention;

FIG. 14C is a graph showing the accuracy plot at the selected slice (Y=60) of the most probable 3D geological model obtained using a single training image (X=50) in one embodiment of the invention;

FIG. 14D is a graph showing the most probable prediction at a selected slice (Y=90) of the most probable 3D geological model obtained using a single training image (X=50) in one embodiment of the invention;

FIG. 14E is a graph showing the dispersion plot at the selected slice (Y=90) of the most probable 3D geological model obtained using a single training image (X=50) in one embodiment of the invention;

FIG. 14F is a graph showing the accuracy plot at the selected slice (Y=90) of the most probable 3D geological model obtained using a single training image (X=50) in one embodiment of the invention;

FIG. 14G is a graph showing the most probable prediction at a selected slice (Y=100) of the most probable 3D geological model obtained using a single training image (X=50) in one embodiment of the invention;

FIG. 14H is a graph showing the dispersion plot at the selected slice (Y=100) of the most probable 3D geological model obtained using a single training image (X=50) in one embodiment of the invention;

FIG. 14I is a graph showing the accuracy plot at the selected slice (Y=100) of the most probable 3D geological model obtained using a single training image (X=50) in one embodiment of the invention;

DETAILED DESCRIPTION

Figure 16:
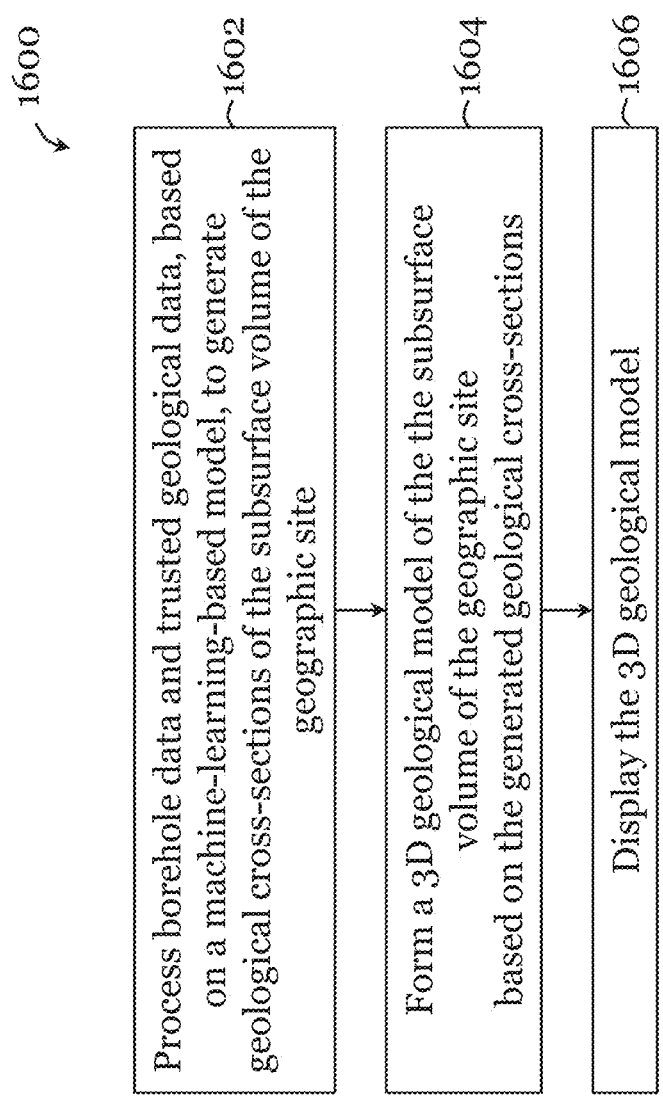
FIG. 16 is a flowchart illustrating a method for generating a 3D geological model of a subsurface volume of a geographic site in one embodiment of the invention.

FIG. 16 illustrates a method 1600 for generating a 3D geological model of a subsurface volume of a geographic site in some embodiments of the invention. The method 1600 is a computer-implemented method arranged to be operated using computer hardware and/or software.

The method 1600 begins in step 1602, in which borehole data and trusted geological data are processed based on a machine-learning-based model, to generate geological cross-sections of the subsurface volume of the geographic site. The borehole data is obtained from multiple boreholes at the geographic site. The borehole data includes data related to subsurface soil and/or rock information (e.g., types of subsurface soil and/or rock) along at least part of each of the boreholes. The trusted geological data relates to data reflecting prior geological knowledge associated with the geographic site, e.g., as learnt or determined by geotechnical engineers. The trusted geological data includes data related to prior stratigraphic information, e.g., stratigraphic pattern, associated with the geographic site. In one example, the prior stratigraphic information associated with the geographic site is the prior stratigraphic information of the geographic site. In another example, the prior stratigraphic information associated with the geographic site is prior stratigraphic information of another site nearby the geographic site and/or another site that is geologically-similar to the geographic site (e.g., when no local trusted data is available for the geographic site to be modelled). In some implementations, the data related to stratigraphic information associated with the geographic site can be represented as two dimensional (2D) image(s) of stratigraphic pattern associated with the geographic site. Each of the geological cross-sections generated contains respective stratigraphic information, e.g., stratigraphic pattern.

In one example, the processing in step 1602 includes applying the borehole data and the trusted geological data to a 3D coordinate system. This helps to orient the data to the same frame of reference for further processing. After the borehole data and the trusted geological data are applied to the 3D coordinate system, the processing includes sequentially processing multiple slices for the subsurface volume in the 3D coordinate system based on the machine-learning-based model, to consecutively (i.e., one after another) generate the geological cross-sections.

In one example, the data related to stratigraphic information associated with the geographic site can be represented as only a single 2D image. In this example, the applying of the borehole data and the trusted geological data to the 3D coordinate system includes arranging the borehole data along a depth (e.g., vertical) direction in the 3D coordinate system, and arranging the single 2D image to extend along the depth (e.g., vertical) direction in the 3D coordinate system. The single 2D image also extends along another direction in the 3D coordinate system.

In another example, the data related to stratigraphic information associated with the geographic site can be represented as two 2D images. In this example, the applying of the borehole data and the trusted geological data to the 3D coordinate system includes arranging the borehole data along a depth (e.g., vertical) direction in the 3D coordinate system, and arranging the two 2D images such that each of them extends along the depth (e.g., vertical) direction in the 3D coordinate system. The two 2D images also each extend along another direction in the 3D coordinate system such that the two 2D images define two imaginary planes. These imaginary planes may define a dihedral angle in the 3D coordinate system. The dihedral angle is larger than 0 degrees and below 180 degrees, e.g., between about 45 degrees to about 135 degrees, at about 90 degrees, etc. In the sequential processing of multiple slices as mentioned above, the slices may include multiple slices arranged generally in parallel with each other and with one of the 2D images, and multiple slices arranged generally in parallel with each other and with another one of the 2D images. The slices arranged in parallel with one of the 2D images and the slices arranged in parallel with another one of the 2D images are not arranged in parallel, and may have the same or different number of slices.

In some implementations, the processing also includes identifying, from the slices, a slice containing the largest amount of borehole data. The sequentially processing may include initially processing the slice containing the largest amount of borehole data based on the machine-learning-based model, then, (i) if the slice first processed is a slice parallel to one of the 2D images, alternately processing the slice(s) parallel to another one of the 2D images and the slice(s) parallel to the one of the 2D images based on the machine-learning-based model until all of the slices are processed, and (ii) if the slice first processed is a slice parallel to another one of the 2D images, alternately processing the slice(s) parallel to the one of the 2D images and the slice(s) parallel to another one of the 2D images based on the machine-learning-based model until all of the slices are processed.

The generated geological cross-section of a processed slice (a slice that has been processed) may be used as additional borehole data in the processing of the next slice (a slice to be processed). In some implementations, the sequentially processing may include first processing the slice containing the largest amount of borehole data, then sequentially processing the remaining slices in the order of decreasing amount of borehole data and additional borehole data contained in the slices, until all the slices have been processed. In the process, if the remaining slices contain the same amount of borehole data and additional borehole data, then one of them is selected (e.g., randomly) for processing.

For each of the slices, the processing may include performing an extrapolation operation based on the machine-learning-based model to determine stratigraphic information for a boundary of the slice if no borehole data is present along a boundary of the slice, and performing an interpolation operation based on the machine-learning-based model to determine stratigraphic information for other parts of the slice with no borehole data. As an example, the extrapolation operation includes determining a template (a processing template) based on the borehole data contained in the slice. The template includes multiple spaced-apart columns of cells parallel to the depth direction, with a first column along a set of borehole data, a second column along another set of borehole data, and a third column along the boundary without borehole data for extrapolation. In this example the extrapolation operation further includes applying the template to the 2D image parallel to the slice to extract stratigraphic relationships and/or statistics, training the machine-learning-based model using the extracted stratigraphic relationships and/or statistics, and applying the template to the slice along one or more paths to iteratively process the slice based on the trained machine-learning-based model to determine stratigraphic information for the boundary. As an example, the interpolation operation includes determining multiple templates based on the borehole data contained in the slice. Each of the templates includes respective spaced-apart columns of cells parallel to the depth direction, including a respective first column along a respective set of borehole data, a respective second column along another respective set of borehole data, and a third column in a space between the first and second columns and without borehole data for interpolation. In this example, the interpolation operation further includes applying the templates to the 2D image parallel to the slice to extract stratigraphic relationships and/or statistics, training the machine-learning-based model using the extracted stratigraphic relationships and/or statistics, and applying the templates to the slice along one or more paths to iteratively process the slice based on the trained machine-learning-based model to determine stratigraphic information for other parts of the slice with no borehole data.

In step 1602, the machine-learning-based model may be trained based on the 2D image(s). The machine-learning-based model can be, e.g., an artificial neural network (such as a convolutional neural network), a multilayer perceptron, a gradient boosting based algorithm (i.e., an algorithm based on gradient boosting technique or its variant), etc.

After step 1602, the method 1600 proceeds to step 1604, in which a 3D geological model of the subsurface volume of the geographic site is formed based on the generated geological cross-sections, and step 1606, in which the 3D geological model is displayed. Steps 1604 and 1606 may be performed separately (form then display) or simultaneously (displayed as it is being formed). The 3D geological model may be formed by assembling the generated geological cross-sections. In some implementations, the 3D geological model has a spatial resolution of 1 $m^3$ or less (with respect to the geographical site). The 3D geological model formed may be a 3D point cloud with multiple points (e.g., voxels)

each containing subsurface soil and/or rock information (e.g., types of subsurface soil and/or rock) modelled as a categorical variable. The 3D geological model of the subsurface volume of the geographic site may correspond to an underground digital twin of the geographic site.

In some implementations, the method 1600 also include quantifying stratigraphic uncertainty associated with the 3D geological model. For example, the quantification may include, for each point in the 3D point cloud, determining a value indicative of a confidence level associated with the subsurface soil and/or rock information contained in the point. The quantification may include performing statistical analysis of multiple equiprobable 3D geological realizations generated based on Monte Carlo simulation. A map of the quantified stratigraphic uncertainty may be displayed, e.g., separately from or alongside with the 3D geological model.

The following disclosure (with reference to FIGS. 1 to 15) provides some example implementations of method 1600.

Inventors of the present invention have developed a data-driven machine learning algorithm called iterative convolution XGBoost for delineating 2D subsurface geological cross-sections, referred to as "2D IC-XGBoost", and disclosed in Shi et al., *Development of subsurface geological cross-section from limited site-specific boreholes and prior geological knowledge using iterative convolution XGBoost. Journal of Geotechnical and Geoenvironmental Engineering*, 147(9), 04021082, the entire content of which is incorporated herein by reference. The 2D IC-XGBoost algorithm integrates training images with the framework of convolution neural network (CNN) to adaptively extract stratigraphic connectivity of varied scales from a single training image.

Inventors of the present invention have now devised, through further research, experiments, and trials, that 2D IC-XGBoost is computationally efficient and can be modified and improved for use in generation of 3D subsurface geological models and underground digital twin.

The following disclosure relates to a data-driven stratigraphic modelling and uncertainty quantification technique for spatial delineation of 3D subsurface stratigraphy from limited site-specific boreholes and prior geological knowledge (or trusted geological data). In some embodiments, the technique relies on sequential simulations of 2D slices, performed using an enhanced IC-XGBoost algorithm (improved from the 2D IC-XGBoost mentioned above) referred to as "IC-XGBoost3D". In some embodiments, the technique adopts a sequential simulation strategy that avoids the need of a qualified 3D training image for stochastic modelling and tackles the difficulty of lack of 3D training images in engineering practice. In some embodiments, the trusted stratigraphic statistics of the geographic site can be represented as 2D training images, which can reveal potential anisotropy. In some embodiments, the technique makes use of sequential prediction at unsampled locations to generate a quasi-3D representation of the subsurface geology.

3D Subsurface Geological Modelling Approach

Inventors of the present invention have previously devised that 2D subsurface geological cross-sections can be delineated using machine learning based algorithms such as IC-XGBoost. The rationale is to combine site-specific measurements with 2D stratigraphic relationships learned from a single training image for conditional simulations. In this type of algorithm, a training image can be regarded as an ensemble of prior geological knowledge of the investigated site.

Inventors of the present invention have now devised that, based on the same rationale, a 3D geological domain can be theoretically modelled from limited site-specific measurements conditioning on a qualified 3D training image. Problematically, the inventors have found it is difficult if not impossible to obtain a qualified 3D training image in practical applications, and the site-specific measurements are often too sparse to directly construct a detailed 3D geological model with required accuracy. While a 3D training image should ideally be used for representing and capturing 3D geological complexity, in geotechnical practice, 3D training images are usually not available or otherwise difficult to obtain because they require explicit information on potential 3D spatial variability of soil types (which is usually not available). On the other hand, it is common practice in geotechnical engineering to perform design based on critical or representative 2D cross-sections. These 2D cross-sections can provide a rich database for training image selection. Inventors of the present invention have thus devised, that instead of using 3D training images, 2D training images can be used for constructing 3D subsurface geological domain from sparse site-specific data for geotechnical practices.

The following disclosure provides, among other things, a sequential simulation method in one embodiment, which can be used to tackle the difficulties associated with lack of 3D training data and with sparse site-specific measurements (i.e., limited real data) in 3D geological modelling.

Figure 1:
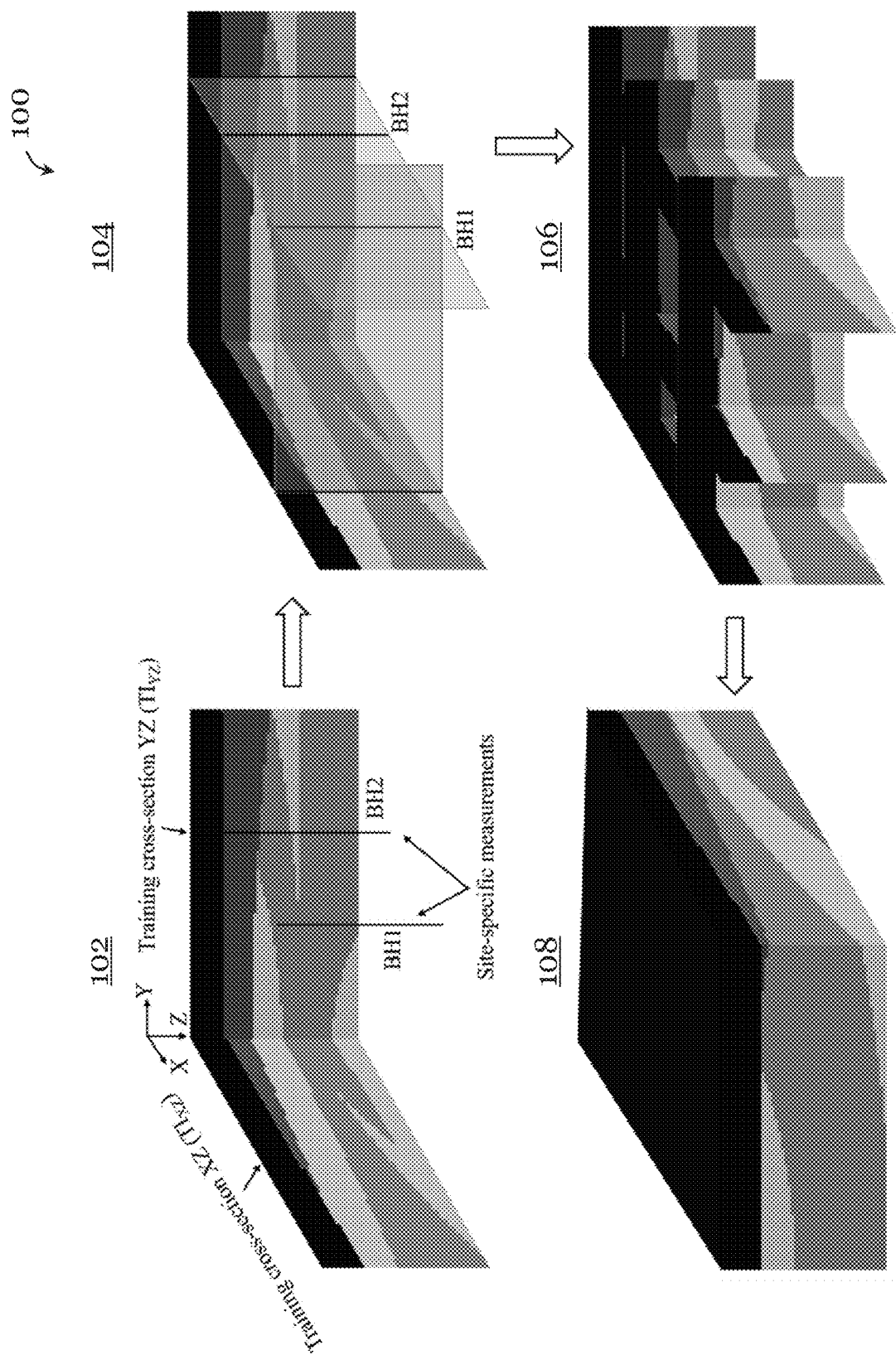
FIG. 1 is a schematic diagram illustrating a 2D simulation based framework for generating a 3D geological model of a subsurface volume of a geographic site in one embodiment of the invention.

FIG. 1 illustrates a framework 100 for developing or generating a 3D subsurface geological model (i.e., delineation of a subsurface 3D geological domain) of a geographical site based on 2D training images in one embodiment of the invention. The 3D geological domain of interest can be visualized as a 3D point cloud.

In this embodiment, in 102, the training images and site-specific measurements are shown. The training images are two 2D training images arranged generally perpendicular to each other. The site-specific measurements are measurements/data specific to the geographical site, which, in this example, includes borehole data obtained from boreholes BH1, BH2 in the site. In 104, the simulation sequence is determined. Specifically, the entire 3D domain can be split into a series of 2D vertical slices along two perpendicular directions. A random simulation path can be determined to visit each simulation slice based on the general principle that a slice with the most site-specific data is visited or simulated first. In 106, the 2D cross-sections of the slices are sequentially predicted or determined. Specifically, the 2D simulation slices (i.e., geological cross-sections) are visited sequentially and associated stratigraphic variations are delineated using a data-driven algorithm as described in further detail below. Then, each simulated geological cross-section is added back to the geological domain and treated as measurements for subsequent conditional simulations. In 108, a 3D realization is reconstructed. Specifically, after developing geological cross-sections along all the 2D slices, a complete 3D realization is reconstructed by assembling all the simulated 2D slices.

As single 2D training image only contains spatial statistics in one direction, to reveal potential stratigraphic anisotropy along different directions, a combination of multiple 2D training images along different directions is needed. In this example, the potential stratigraphic connectivity of each 2D slice is learned from a training image that is in parallel to the concerned 2D slice. A pair of 2D perpendicular training images can be used to represent the anisotropic stratigraphic connectivity along different directions in a 3D geological domain. In one example, if the geology of the site of interest is isotropic, it is also possible to delineate stratigraphic connectivity along different directions using a single training image and to generate an isotropic 3D geological domain from a single training image. In practice, the determination of isotropic and anisotropic geological features relies on subjective judgement by engineers.

In this example, to address the problem associated with sparse or limited site-specific measurements, a sequential simulation procedure is applied to consecutively model a series of 2D vertical slices. A 2D slice simulated from a previous step is used as additional site-specific measurements for conditional simulations of a subsequent 2D slice. In other words, during each simulation step, the training image in parallel to the simulation slice is used and combined with the site-specific measurements (including both the original measurements and additional data obtained from previous simulations) for stochastic simulations. Using such method, the modelling of a 3D geological domain can be converted to sequential simulations of a series of 2D vertical slices, which can be achieved by machine learning of a 2D training image and sparse site-specific measurements. As the spatial prediction proceeds, stratigraphic connectivity extracted from the 2D perpendicular training images are gradually added to the 3D point cloud, replicating the 3D spatial anisotropic patterns. Therefore, the difficulties in digital representation of a 3D geological domain due to a lack of 3D training image and sparse site-specific measurements can be tackled by the method of this embodiment with a pair of 2D training images and the sequential simulation procedure.

In this example, the existing 2D IC-XGBoost algorithm is modified, and improved, for construction of a 3D geological domain by learning stratigraphic patterns from a pair of training images following a random simulation sequence. In addition, in this example, the existing 2D IC-XGBoost is improved by incorporating extrapolation and pre-training strategy aiming to improve associated computational efficiency, which facilitates development of 3D geological models. Main elements of the framework for 3D geological modelling in this embodiment are described further below.

One main element of the framework is the training images.

The method in this embodiment constructs a 3D subsurface geological domain conditioning on site-specific measurements and a pair of training images, which are conceptual statistical model of the geology believed (trusted) to exist in the area (site) of interest. Training images provide a quantitative framework to leverage valuable prior geological knowledge for geological modelling.

In FIG. 1, 102, there is shown an example of two perpendicular training images and two site-specific boreholes (BH1 and BH2). In this example, the 3D subsurface geological model includes four soil types. The two training images, $TI_{XZ}$ and $TI_{YZ}$, reflect the believed or trusted spatial variability of the subsurface stratigraphic patterns in the two perpendicular directions, i.e., X-direction and Y-direction. Each training image depicts the geometric characteristics of each soil layer expected to present in the stratigraphy and the complex stratigraphic connectivity between different soil layers in the same direction. The combination of two training images depicts the horizontal anisotropy and facilitates a quasi-3D representation of the subsurface stratigraphy. In this embodiment, the two training images are arranged perpendicularly. However, it should be noted that in some other embodiments, the two training images need not be perpendicular to each other and can be intersected with an angle other than 90 degrees (larger than 0 degree and smaller than 180 degrees). Without loss of generality, in the following disclosure, two perpendicular training images are used unless otherwise specified.

As mentioned, in some embodiments, it is possible to use a single training image for spatial modelling when the geological domain is isotropic and the adopted single training image can describe stratigraphic features along other directions. In this context, the term isotropic refers to a situation that the stratigraphic connectivity reflected along different directions (e.g., X and Y directions) can be properly reflected by, or find counterparts in, a single ensemble training image. In geosciences, the potential training images can be directly constructed from outcrops or indirectly generated using object-based and process-based techniques. For geological and geotechnical applications, development of 2D cross-sections is a prerequisite for projects in practice. Thus, there exists a rich database of training images. Also, training images can readily be borrowed from previous projects at nearby sites or with similar geological settings. The compatibility of potential training images with site-specific data (e.g., boreholes) can be evaluated using different techniques including, e.g., distribution of runs, multiple-point density function (MPDF) or stratigraphic edge orientation histogram. The application of training images for spatial modelling is established on the assumption that stratigraphic patterns repeat in the area of similar geological origins.

Another main element of the framework relates to determination of simulation sequence and section location.

In this embodiment, a 3D geological domain is constructed by sequentially generating 2D geological cross-sections and reassembling them into a 3D point cloud. The sequence and locations of 2D simulation slices would affect the accuracy of the modelled 3D geological domain. Essentially, the simulation sequence is established based on the principle that each 2D simulation slice contains as many conditioning data as possible. Note that the conditioning data includes both original site-specific boreholes and results obtained from previous simulation step(s).

Figure 2B:
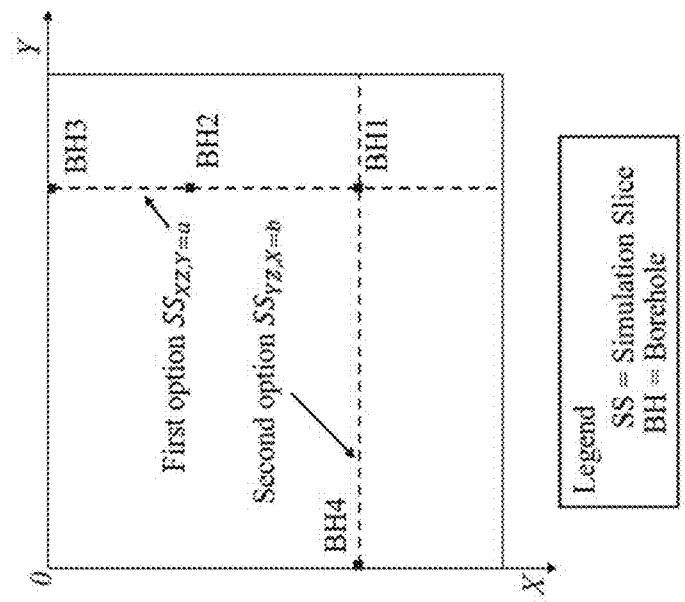
FIG. 2B is a schematic diagram illustrating an arrangement of site-specific measurements (borehole data) in the determination of location and sequence of slices for the 2D simulation in one embodiment of the invention.
Figure 2A:
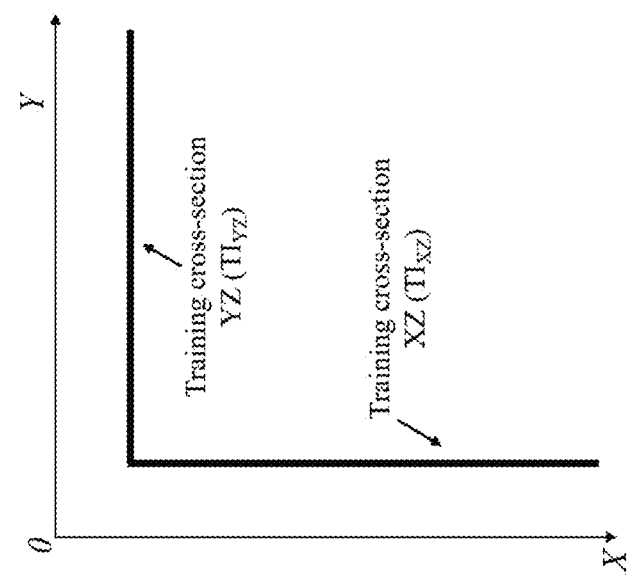
FIG. 2A is a schematic diagram illustrating an arrangement of two 2D training images in the determination of location and sequence of slices for the 2D simulation in one embodiment of the invention.

FIGS. 2A and 2B generally illustrate the process of determining the sequence and location of 2D simulation slice in one embodiment, with FIG. 2A showing the layout of training images and FIG. 2B showing the layout of site-specific measurements. In this embodiment, a 3D point cloud of dimension $N_X \times N_Y \times N_Z$ is projected into the 2D horizontal layout plan (Z=0), and a vertical 2D cross-section is represented by a line in FIGS. 2A and 2B. Two perpendicular training images ($TI_{YZ}$ and $TI_{XZ}$) are represented by thick lines in FIG. 2A. Four site-specific boreholes (i.e., BH1, BH2, BH3 and BH4) are represented by solid squares in FIG. 2B.

The simulation sequence starts with a simulation slice (SS) having the largest number of site-specific boreholes. For example, there are two candidate simulation slices, i.e., $SS_{XZ,Y=a}$ and $SS_{YZ,X=b}$, where a and b denote coordinates along Y and X directions, respectively. $SS_{XZ,Y=a}$ contains three boreholes. $SS_{YZ,X=b}$ contains two boreholes. As $SS_{xz,y=a}$ has more site-specific measurements, it ranks first in the simulation sequence. Mathematically, the above procedure for determining the order of a simulation slice can be described by the following equation.

$$SS = \begin{cases} SS_{YZ,X=b}, & \text{if } \text{argmax}_b N_{BH}[SS_{YZ,X=b}] \geq \text{argmax}_a N_{BH}[SS_{XY,Y=a}] \\ SS_{XY,Y=a}, & \text{if } \text{argmax}_b N_{BH}[SS_{YZ,X=b}] < \text{argmax}_a N_{BH}[SS_{XY,Y=a}] \end{cases} \quad (1)$$

where $N_{BH}[\cdot]$ is the total number of boreholes within a given simulation slice. $N_{BH}[SS_{YZ,X=b}]$ represents the total number of boreholes (including original boreholes and results obtained from previous simulation steps) within cross-section $SS_{YZ,X=b}$, which is a cross-section in parallel to YZ plane and has a X value of b. Similarly, $N_{BH}[SS_{XY,Y=a}]$ represents the total number of boreholes within cross-section $SS_{XY,Y=a}$. If a collection of 2D simulation slices (two or more) have the same number of measurements, a 2D simulation slice is randomly selected from the collection for spatial prediction. The remaining 2D simulation slices in the collection are simulated following alternated directions until all the 2D simulation slices are simulated. In other words, if a randomly drawn simulation slice in parallel to X direction is first predicted, then the next simulation goes to a randomly drawn simulation slice in parallel to Y direction followed by going back to another randomly drawn simulation slice in parallel to X direction. Likewise, if a randomly drawn simulation slice in parallel to Y direction is first predicted, then the next simulation goes to a randomly drawn simulation slice in parallel to X direction followed by going back to another randomly drawn simulation slice in parallel to Y direction. After identifying the first simulation slice on the simulation sequence, the spatial prediction of unsampled profiles within the simulation slice is carried out using the algorithm described in further detail below.

In this embodiment, only the training image parallel to the simulation slice is used for spatial prediction of unsampled areas in the simulation slice. After a geological cross-section simulation slice is developed, the whole simulation slice is treated as measurements (i.e., a cluster of additional boreholes) and added back to the layout plan in FIG. 2B for the determination of next simulation slice. For example, if the simulation slice has a size of 50 (depth)×100 (horizontal) with a resolution of 2 m, the total number of additional boreholes is 50 (=100/2) after adding the developed slice (i.e., SS) back to the layout plan in FIG. 2B. Therefore, the total number of conditioning boreholes for the next simulation slice includes site-specific boreholes and additional boreholes computed from previous steps. The simulation slices with the largest $N_{BH}$ along X-direction and Y-direction are determined separately and compared accordingly. The simulation slice with the largest number of boreholes (hence most borehole data) is designated as the next simulation slice. If the largest number of boreholes (hence most borehole data) is identical in both directions, a random draw is performed to select the next simulation slice. The above-mentioned steps are repeated until all the 2D slices within the 3D geological domain are simulated.

Another main element of the framework relates to spatial prediction of 2D simulation slice using XGBoost based algorithm.

In this embodiment, after determining the sequence and locations of 2D simulation slices, the subsequent spatial predictions conditioning on boreholes and paralleled training images are carried out using an enhanced IC-XGBoost machine learning algorithm, which is improved from the 2D IC-XGBoost disclosed in Shi et al. mentioned above and incorporated herein by reference. 2D IC-XGBoost can be viewed as a regression algorithm for determining unknown soil types between known site-specific measurements. The underlying mathematics of the 2D IC-XGBoost algorithm can be found in Shi et al. mentioned above and incorporated herein by reference. For brevity, the following only described some key components of the 2D IC-XGBoost algorithm.

Figure 3A:
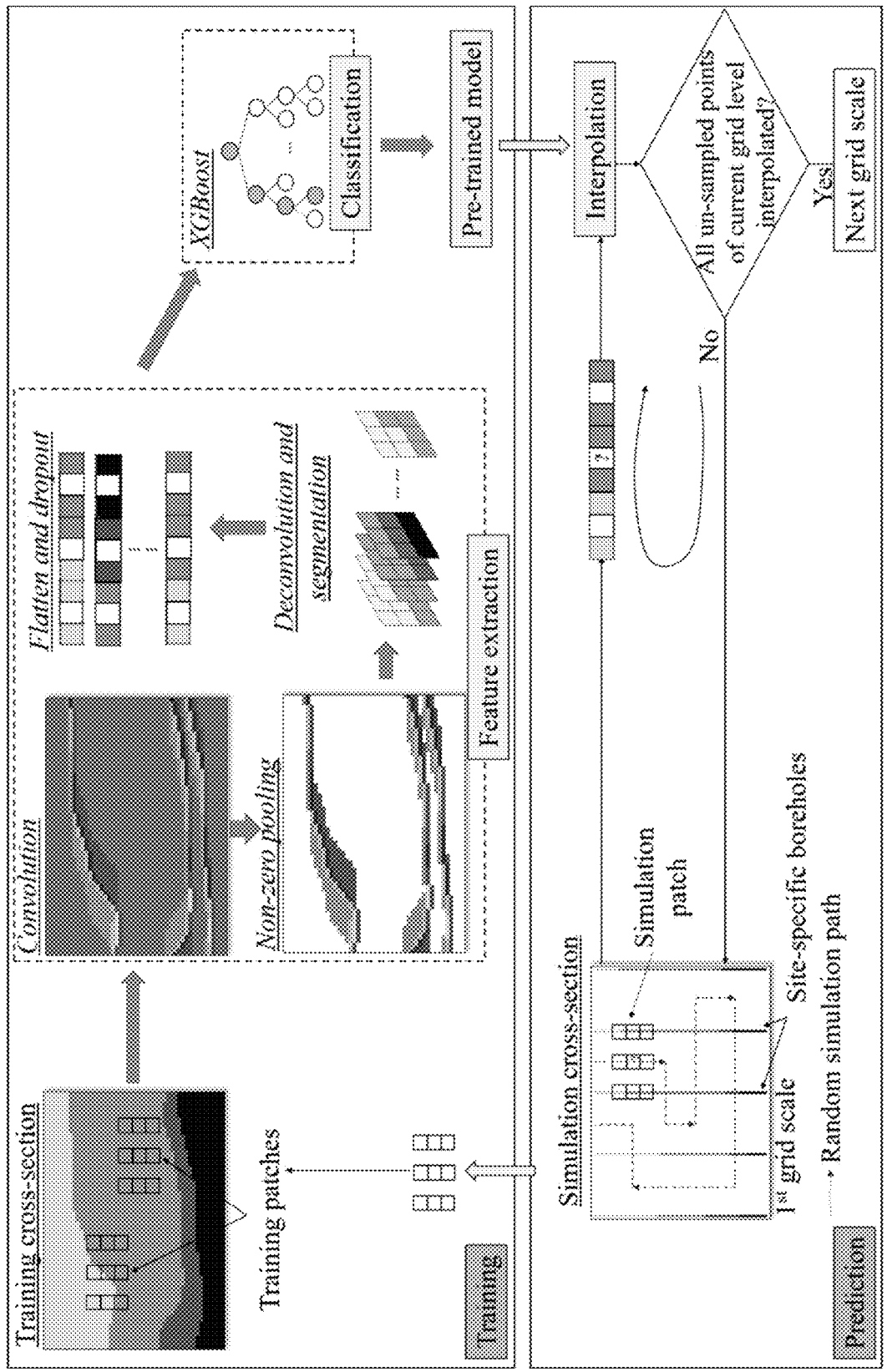
FIG. 3A is a schematic diagram illustrating extraction of large-scale stratigraphic features and corresponding spatial prediction using a modified CNN model in an XGBoost-based algorithm in one embodiment of the invention.
Figure 3B:
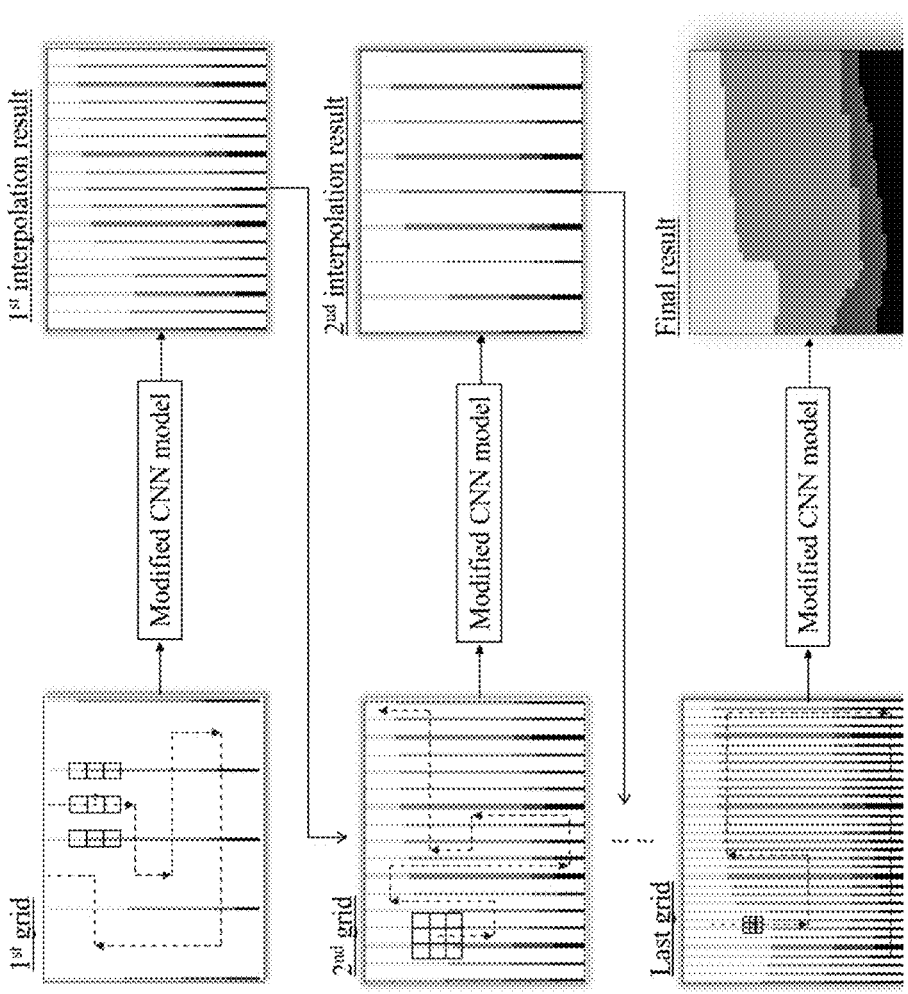
FIG. 3B is a schematic diagram illustrating integrative prediction operation in the XGBoost-based algorithm in one embodiment of the invention.

FIGS. 3A and 3B illustrate some key features of the 2D IC-XGBoost algorithm, with FIG. 3A illustrating extraction of large-scale stratigraphic features and corresponding spatial prediction using modified CNN model and FIG. 3B illustrating iterative prediction operation.

The 2D IC-XGBoost roots in the framework of a convolution neural network (CNN). It uses multi-scale templates to extract potential stratigraphic relationships from a single training image through iterative convolution. The extracted stratigraphic patterns serve as input for training the XGBoost model, which is used for subsequent spatial prediction.

FIG. 3A shows the extraction of large-scale stratigraphic features and corresponding spatial prediction. The large-scale simulation patch, i.e., three columns with known and unknown stratigraphy, adaptive to the original measurements is first determined. Subsequently, the simulation patch is transferred to the training part to scan the training cross-section. Typical stratigraphic connectivity within the training cross-section is extracted using convolution in CNN. The extracted stratigraphic patterns serve as input data to train XGBoost models, which are used for onward spatial prediction of a large-scale grid. The spatial prediction of large-scale patterns follows a random simulation path, i.e., dashed line, until all the unknown points of current grid scale are predicted. In this example, the above process can only predict soil types at a single grid scale.

FIG. 3B shows an iterative prediction process using gradually reduced simulation patches. The results obtained from previous grid scale are treated as additional measurements and combined with original measurements for the second round of spatial prediction. The above procedures repeat until all the unknown points in the simulation cross-section are predicted. It should be noted that the 2D IC-XGBoost model cannot be used for extrapolation. In addition, the iterative convolution and prediction process in the 2D IC-XGBoost model is time-consuming if it is directly used for 3D geological modelling.

To address these issues, some embodiments of the invention have provided an enhanced IC-XGBoost algorithm, IC-XGBoost3D, which is described in further detail below. However, briefly, in these embodiments of the enhanced IC-XGBoost algorithm, new multi-scale templates are designed for enabling extrapolation, and a pre-training strategy is applied for improving computational efficiently, which is particularly useful for the development of 3D geological models. By using the enhanced IC-XGBoost algorithm in these embodiments, unsampled points within a simulation slice can be determined more accurately and efficiently. Also, in some embodiments of the enhanced IC-XGBoost algorithm, for a given simulation slice, extrapolation is first carried out followed by interpolation. Multi-scale templates amenable to a simulation slice are determined. Those templates can be used to scan the paralleled training image for extracting associated stratigraphic patterns, which are then used for training XGBoost model and subsequent conditional simulations.

Another main element of the framework relates to quantification of stratigraphic uncertainty.

A completed 3D simulation domain is called a realization. Multiple stochastic realizations are generated conditioning on the same set of site-specific measurements and training images. Each realization represents a possible representation of the 3D subsurface geological model of the site under investigation. The most probable prediction $Z_{mp}(x)$, where x is spatial coordinates and belongs to a three-dimensional space, i.e., $x \in \mathbb{R}^3$, can be obtained by assigning each point x in the 3D space with the soil category with the highest occurrence frequency. The most probable prediction is taken as the final prediction results of the method in this embodiment. In addition, the stratigraphic uncertainty associated with the most probable prediction can be explicitly quantified via statistical analysis of multiple realizations. In this embodiment, the uncertainty of soil type at x is measured by dispersion, Dp(x), which is defined as the proportion of non-matching soil type among $N_r$ realizations as compared with that of $Z_{mp}(x)$. Mathematically, the dispersion Dp(x) is calculated by the following equation.

$$Dp^{3D}(x) = \frac{\sum_{r=1}^{N_r} I(Z_r(x) \neq Z_{mp}(x))}{N_r}, x \in \mathbb{R}^3 \quad (2)$$

where I is an indicator function and has a value of 1 if the condition within the parenthesis is true, or 0 otherwise; $Z_r(x)$ is the r-th realization result. The dispersion represents the confidence level of the spatial prediction at each point x in the 3D space. The dispersion ranges between 0 and 1, and a large value denotes a low prediction confidence level. A 3D dispersion plot can be constructed by assembling dispersion estimated at each point x in the 3D space.

Some method embodiments of the invention share the same principle of stochastic simulation with those of geostatistical simulations (e.g., SIS, MPS and SGS). The uncertainty of the method in some embodiments of the invention may come from two sources, namely, stochastic simulation and neural network. In this embodiment, the last activation function of the adopted neural network is the softmax function, which normalizes the output of the network to a probabilistic distribution over predicted output classes. The uncertainty from both sources is caused by the limited amount of local data. Equation (2) only calculates a dispersion of the model outputs and is not "uncertainty" in terms of higher or lower probability that the model corresponds to the "true" geology.

In some embodiments, the stochastic simulation process terminates when the derived most probable prediction does not vary significantly as the realization number increases. In this embodiment, the percentage change in the most probable prediction, Pc, for every k additional realizations is adopted to regulate the simulation process.

$$Pc = \frac{\sum_{i=1}^{N_X \times N_Y \times N_Z} I(Z_{mp}^{N_r}(x_i) \neq Z_{mp}^{N_r-k}(x_i))}{N_X \times N_Y \times N_Z}, x_i \in \mathbb{R}^3 \quad (3)$$

where $N_X$, $N_Y$ and $N_Z$ are the total point numbers in the X, Y and Z directions, respectively; $Z_{mp}^{N_r-k}(x_i)$ and $Z_{mp}^{N_r}(x_i)$ denote the soil type at $x_i$ derived from $N_r$–k and $N_r$ realizations, respectively. For example, in the illustrative examples of this disclosure, k is taken to be 10 and a Pc value of 0.5% is designated as the termination criterion. For illustrative examples in the following, the underlying ground truth geological domain is available. Therefore, it is possible to compare the generated 3D model with the ground truth model for validating the method embodiments of the invention. The deviation of multiple realizations from the ground truth geological model can be measured by accuracy (Acc):

$$Acc^{3D} = \frac{\sum_{i=1}^{N_X \times N_Y \times N_Z} I(Z_T(x_i) = Z_{mp}(x_i))}{N_X \times N_Y \times N_Z}, x_i \in \mathbb{R}^3 \quad (4)$$

where the indicator function I has a value of 1 when the most probable prediction $Z_{mp}(x_i)$ has the same soil type as that of $Z_T(x_i)$ at the same location $x_i$. The above equation can be used to calculate the accuracy of each soil type by simply replacing the 3D size ($N_X \times N_Y \times N_Z$) with the size of corresponding soil type. It should be noted that in practical site investigation, the underlying ground truth 3D geological domain is not available, and accuracy is used here to validate the method in this embodiment only.

IC-XGBoost3D Algorithm

As mentioned, some embodiments of the invention provide an IC-XGBoost3D algorithm for 3D geological modelling. The IC-XGBoost3D algorithm can be considered as an improved version of the 2D IC-XGBoost algorithm mentioned above. Specifically, two enhancements are made to the 2D IC-XGBoost algorithm for improving its capacity and computational efficiency. One of the enhancements is to deal with extrapolation when no site-specific measurements are available along model boundaries. In some implementations, extrapolation of model boundary is performed first whenever there is no site-specific measurement along model boundary. After extrapolation, the delineation of unsampled locations within a 2D geological cross-section is conducted using the 2D IC-XGBoost algorithm.

Figure 4:
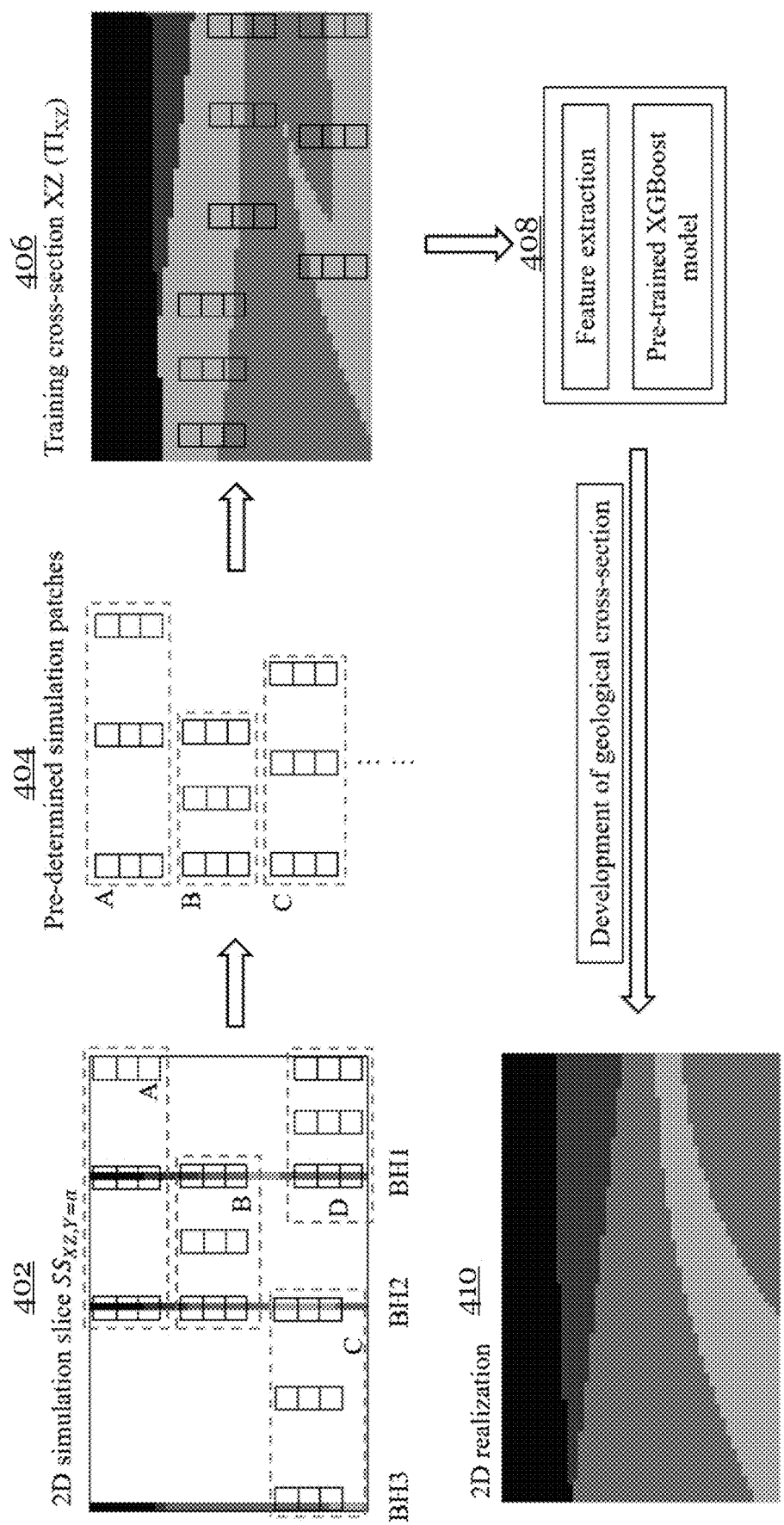
FIG. 4 is a schematic diagram illustrating delineation of a single simulation slice using an XGBoost-based algorithm in one embodiment of the invention.

FIG. 4 illustrates the process of developing a 2D geological cross-section when no site-specific measurements are available along model boundaries. Specifically, FIG. 4 illustrates delineation of a single simulation slice using the IC-XGBoost3D algorithm in this embodiment.

Referring to FIG. 4, in 402, multi-scale templates adaptive to the simulation slice is determined, and in 404, all the potential multi-scale templates are collected. In 406, the templates are applied to exhaust all multi-scale stratigraphic patterns from the training image. In 408, the XGBoost model is trained or pre-trained using all the collected stratigraphic patterns, and in 410, spatial prediction of 2D simulation slice is performed.

Referring to 402, a 2D simulation slice $SS_{XZ,y=a}$ contains three boreholes BH1, BH2 and BH3. Multi-scale templates amenable to $SS_{XZ,Y=a}$ are used to scan the paralleled training image, $TI_{XZ}$, in 406, and extract associated stratigraphic connectivity. As shown in 402 and 404, in this example, each template includes nine cells and is divided into three columns with varied horizontal spacing. For example, the templates B and C are adaptive to the simulation slice and have an unknown central column lying in the centerline between two columns of known soil stratigraphy. The determined templates in 404 are then transferred to the paralleled training image to extract stratigraphic patterns, which are then used for training XGBoost model and subsequent conditional simulations in the 2D IC-XGBoost algorithm. In this embodiment, a template A is designed for extrapolation. The template has the unknown column lying along the right boundary of $SS_{XZ,Y=a}$, and the other two distant columns align with the two closest boreholes BH1 and BH2. The new template A is specifically designed for extrapolation operation and is established on the assumption that soil types along an unknown profile are correlated with stratigraphy revealed by nearest neighbors. In this example, of all the potential multi-scale templates (A, B, C and D) from a simulation slice, template A has the priority over the other templates for feature extraction from the training image and subsequent conditional simulations. This is because templates B, C and D are designed for interpolation, whose performance relies on the computed results from extrapolation using template A. For example, the right column of template D aligns with the right model boundary, and the interpolation of central unknown column relies on the extrapolation results of right column using template A. It should be noted that the three columns of a template do not necessarily need to have equal spacing. In some embodiments, the spacing is adapted to the updated simulation results at each simulation step. For example with the addition of new simulation results, the spacing between adjacent boreholes is gradually reduced. Multi-scale templates with reduced spacing between adjacent columns are adopted for extracting stratigraphic patterns of reduced scales.

Another one of the enhancements is to determine the multi-scale simulation templates for pre-training, or to determine all the multi-scale simulation templates of varied scales that are amenable to the simulation slice at the start of simulation. For example, in FIG. 4, the direct templates adaptive to the original site-specific measurements include templates A, B and C. Template D is classified as intermediate as its performance relies on results computed from previous simulation steps. All the direct and intermediate templates are pre-determined at the start of simulation. The collected multi-scale templates are applied to exhaust all the stratigraphic relationships embedded in training images. All the extracted spatial statistics are used to pre-train an XGBoost model, which is consecutively used for the sequential delineation of 2D simulation slices. As shown in 404 and 406, the three templates A, B, C and other templates of reduced spacing are collected altogether and applied to the single training cross-section $TI_{XZ}$ to extract all the potential stratigraphic relationships. All the extracted spatial statistics serve as an input to train the XGBoost model, which is used subsequently for both extrapolation and interpolation. In this embodiment, the pre-training strategy can significantly reduce computational cost associated with the method in this embodiment. This is because the feature extraction from training images is only carried out twice, i.e., one for extrapolation and one for interpolation, at the start of 3D geological modelling. In one example, due to the implementation of pre-training strategy, the simulation time for the delineation of a single 2D simulation slice can reduces from more than 5 minutes to less than 15 seconds using a PC with Intel® Core™ i7-4790 CPU @3.60 GHz and 8.00 GB RAM, which dramatically improves the computational efficiency. In this example, a Python script has been developed to run the numerical simulations.

Illustrative Example

Two 3D geological domains of dimension 100 m (X-distance)×100 m (Y-distance)×50 m (Z-depth) are simulated to illustrate the operability and performance of the method in some embodiments of the invention. In this example, each full 3D geological domain is discretized into a point cloud of 100×100×50 using a resolution of 1 m, resulting in a total of 0.5 million voxels. The adopted resolution and model size generally align with typical geotechnical site investigation for excavations and slopes. In this example the stratigraphic boundaries separating different soil layers are modelled as 3D surfaces and can be described by the following equation:

$$AX^2+BX+CY^2+DY+EZ^2+FZ+G=0 \qquad (5)$$

where X, Y and Z denote the directions of a standard Cartesian coordinate system, and A, B, C, D, E, F and G are coefficients of the 3D surface. Voxels lying above and voles lying below a 3D surface are assigned different soil types. In this example there are six 3D surfaces in total. The statistics of coefficients for all the 3D stratigraphic boundaries are summarized in Table 1.

TABLE 1

Summary of coefficients for the 3D stratigraphic function
$AX^2 + BX + CY^2 + DY + EZ^2 + FZ + G = 0$

| Stratigraphic Surface | A Mean | A Std. | B Mean | B Std. | C Mean | C Std. | D Mean | D Std. | E Mean | E Std. | F Mean | F Std. | G Mean | G Std. |
|---|---|---|---|---|---|---|---|---|---|---|---|---|---|---|
| I | 0.0003 | 0.002 | 0 | 0.03 | 0 | 0.002 | −0.01 | 0.03 | 0 | 0.002 | 1 | 0.03 | −10 | 5 |
| II | 0 | | −0.1 | | 0.0006 | | 0 | | 0 | | −1.1 | | −15 | |
| III | −0.0005 | | 0 | | −0.003 | | 0 | | 0 | | −1.1 | | −25 | |
| IV | 0.002 | | 0 | | −0.001 | | 0 | | 0 | | −1.1 | | −32 | |
| V | 0.005 | | 0 | | 0 | | 0.01 | | 0 | | −1 | | −32 | |
| VI | 0 | | 0.02 | | 0.008 | | 0 | | 0 | | −1.1 | | −42 | |

"Std." denotes standard deviation

Figure 5A:
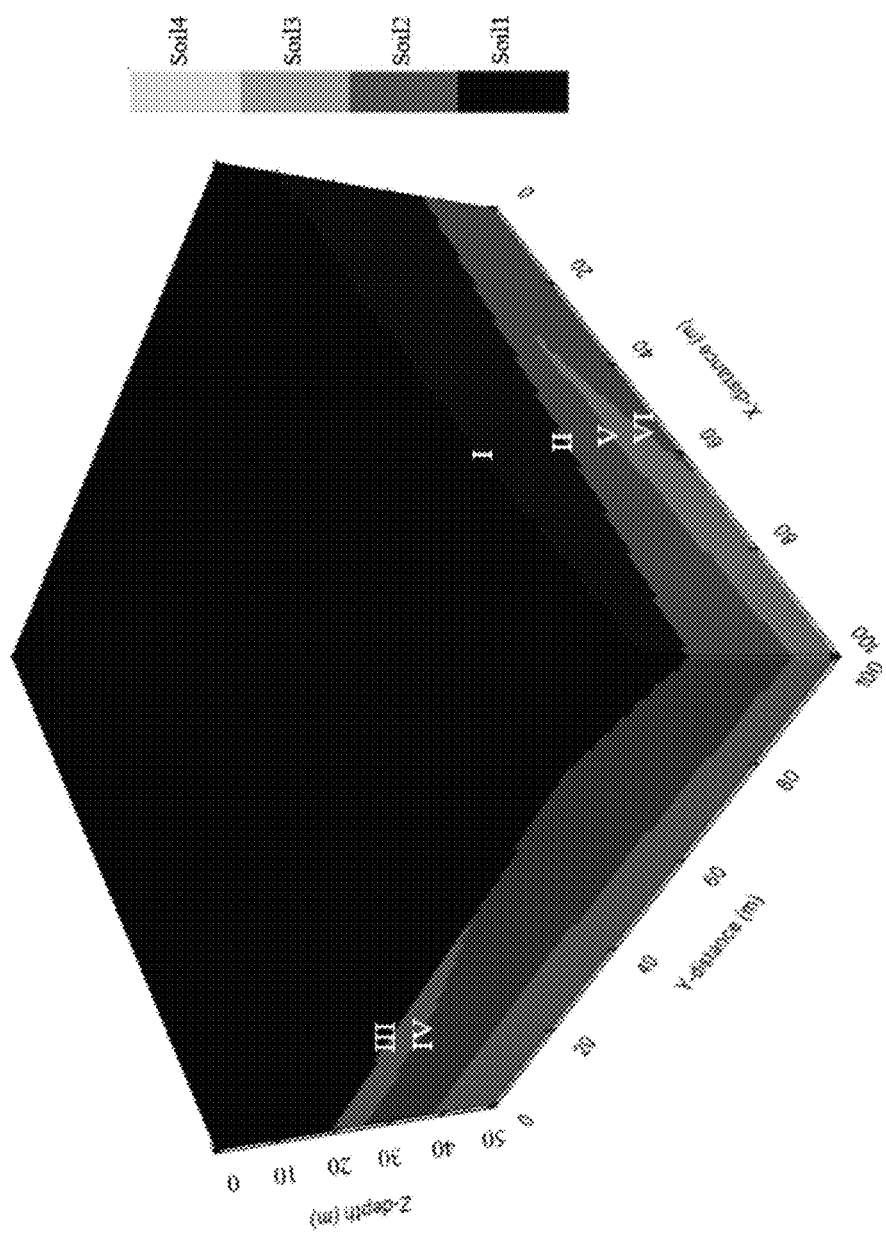
FIG. 5A is a plot showing a simulated 3D training geological domain (volume) in one embodiment of the invention.
Figure 5B:
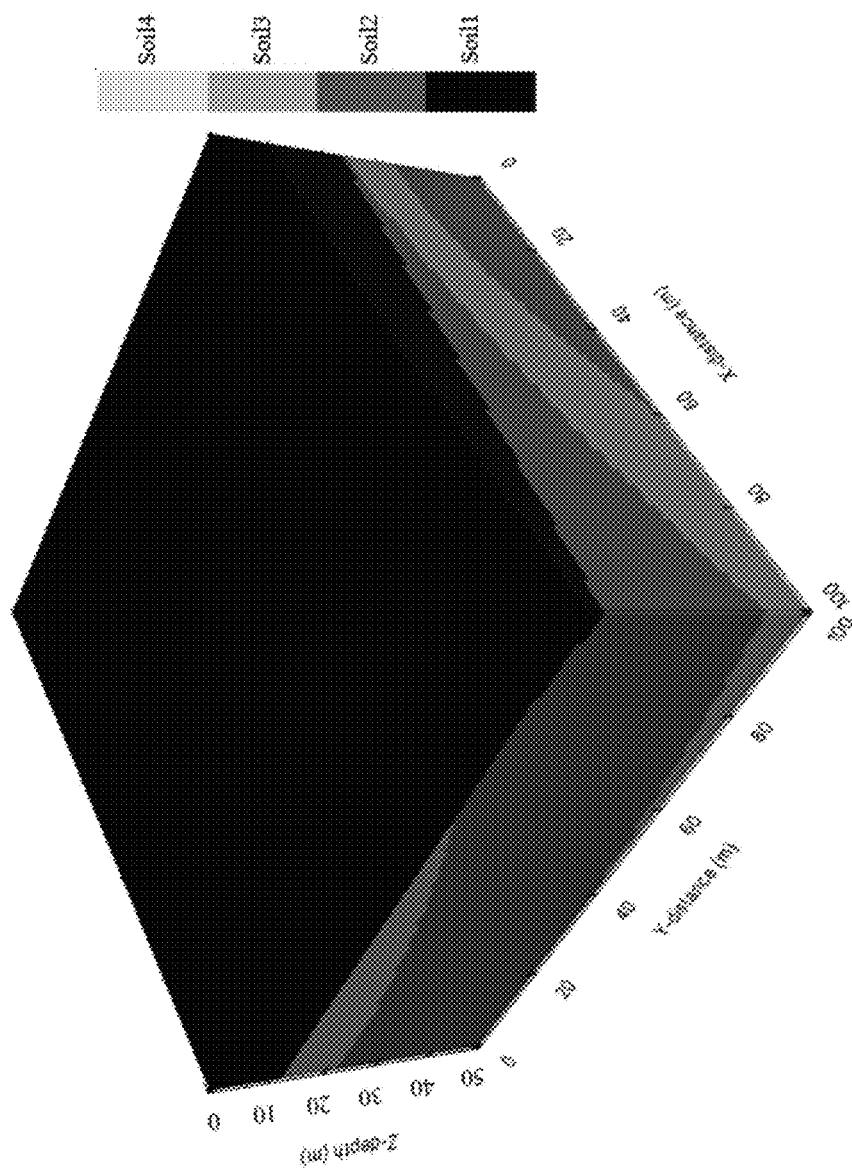
FIG. 5B is a plot showing a simulated 3D test geological domain (volume) in one embodiment of the invention.
Figure 5C:
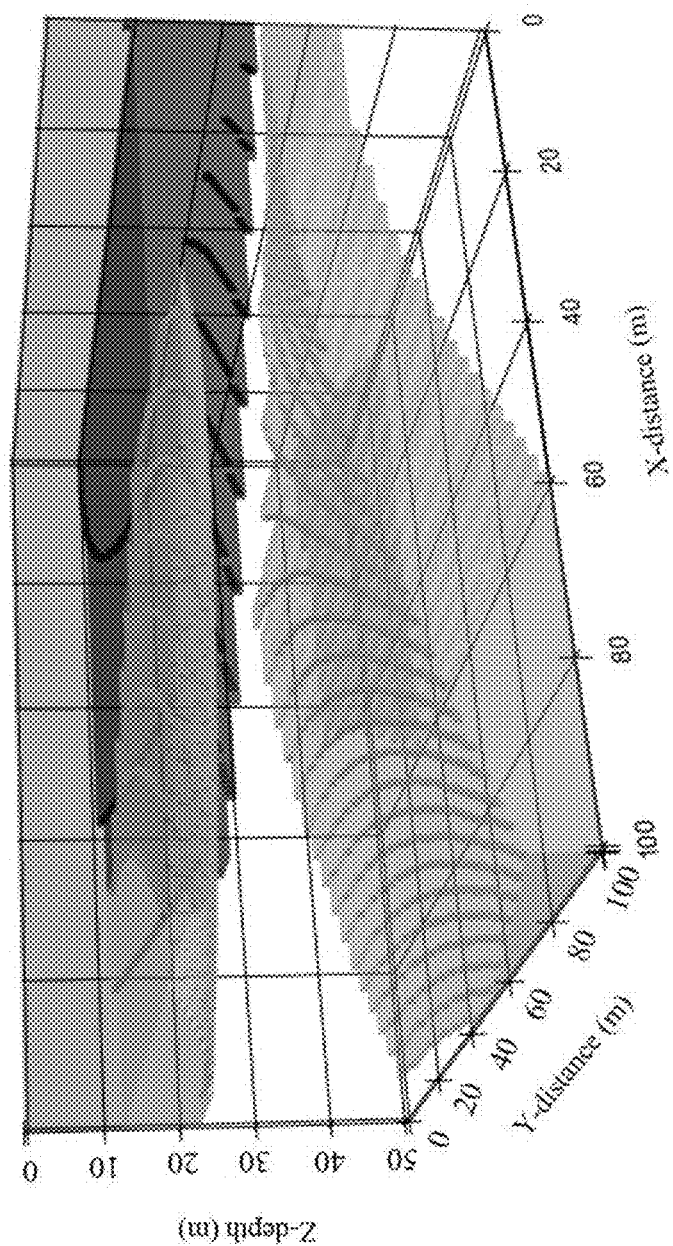
FIG. 5C is a perspective plot of the simulated 3D test geological domain (volume) of FIG. 5B.
Figure 5D:
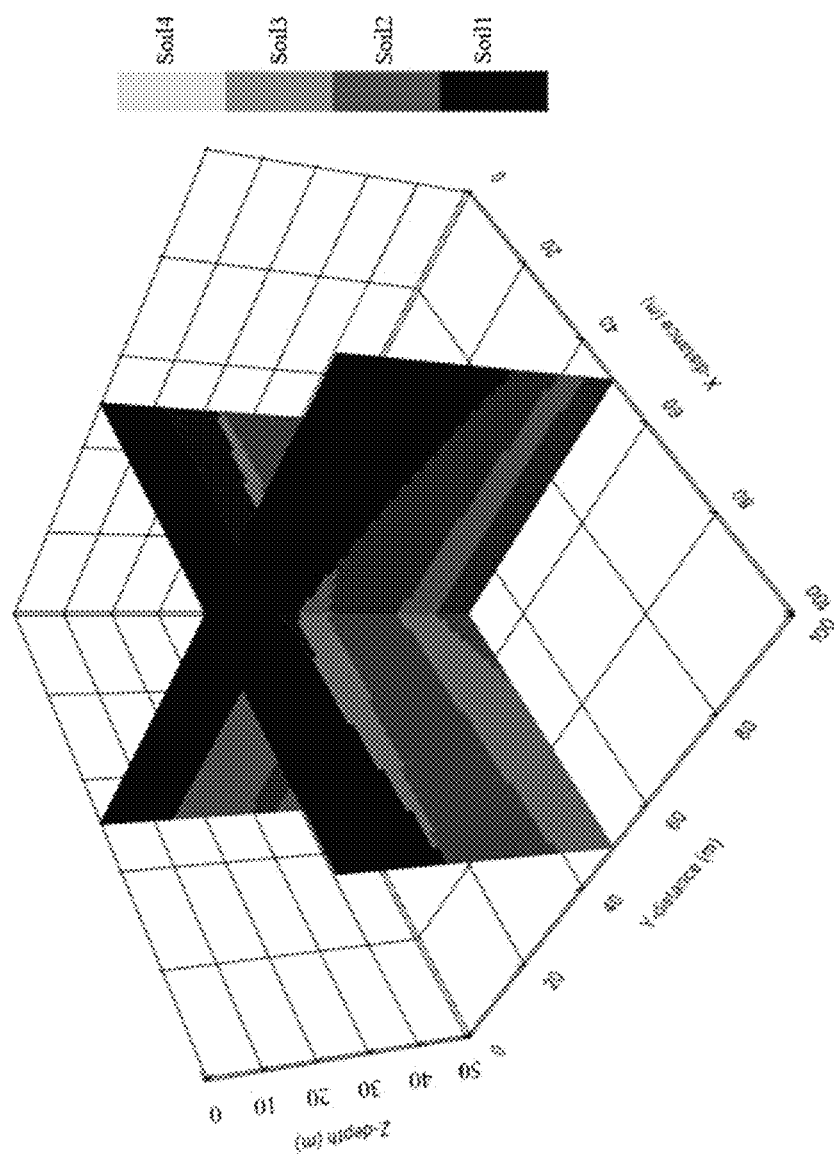
FIG. 5D is a plot illustrating two generally perpendicular training images extracted from the simulated 3D training geological domain of FIG. 5A.
Figure 5E:
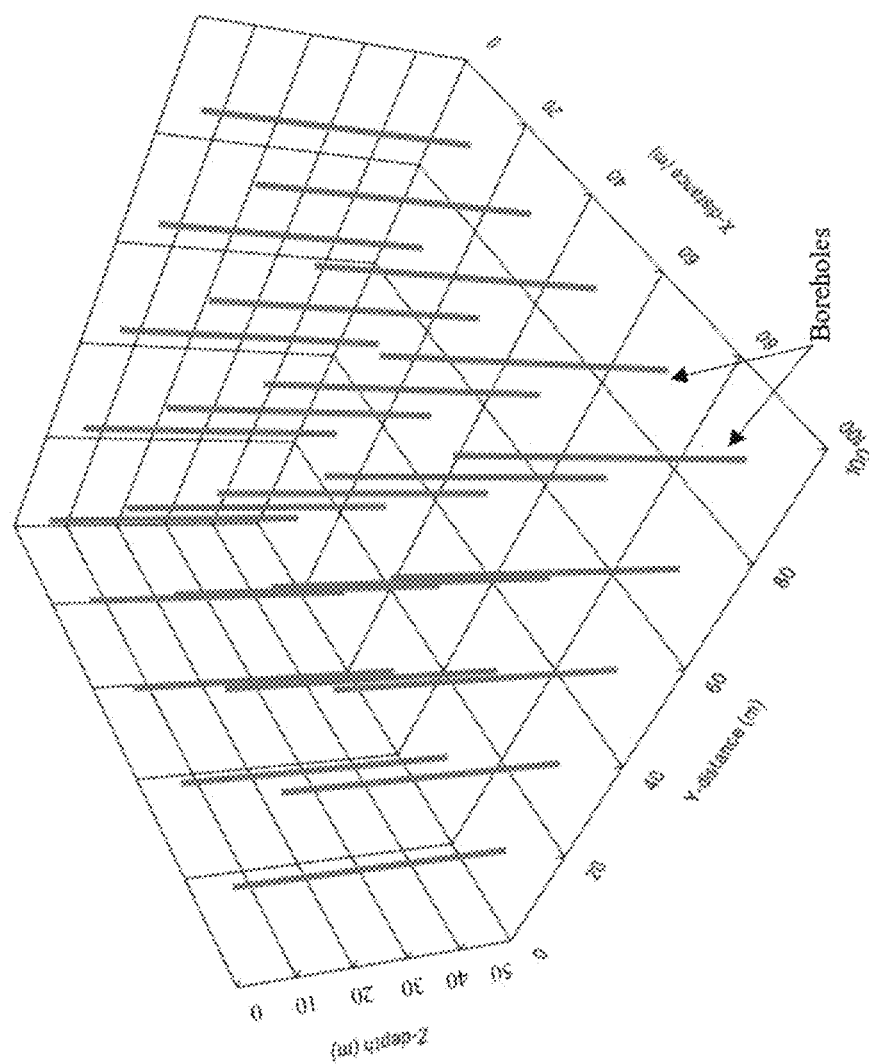
FIG. 5E is a plot illustrating 25 site-specific boreholes extracted from the simulated 3D test geological domain of FIG. 5B.

FIGS. 5A and 5B show the generated 3D training and test geological domains with four soil types. The perspective view of the 3D model is shown in FIG. 5C. It can be seen that soil4 mainly consists of two parts. The shallower part mainly locates at a depth of approximately 20 m and the deeper part distributes between a depth of 30 m and 50 m. As an illustration, as shown in FIG. 5D, two vertical slices are taken from the 3D training geological domain as training images. Both of the vertical slices are perpendicular to each other and lie along the centerlines of the 3D training geological domain. In this example, the site has a plan area of 100 m×100 m. If a regular spacing between boreholes is taken as 20 m, the total number of boreholes is 25 (=5×5). FIG. 5E shows the 25 site-specific boreholes extracted from the 3D test geological domain. The 25 boreholes account for 0.25% of all the voxels in the 3D point cloud. While in this embodiment the boreholes are evenly distributed, it should be noted that some embodiments of the invention also apply to the case with irregular spaced site-specific measurements.

Further simulation results are obtained using the method in this embodiment.

Multiple 3D realizations are generated following the simulation procedures described above. The total simulation time for generating a 3D subsurface geological model is approximately 14 minutes (using a personal computer with Intel(®) Core(™) i7-10750H CPU @ 2.60 GHz and 16.0 GB RAM), which is generally affordable for practical engineering applications. The simulation time can be reduced using more advanced computer or efficient programming techniques.

In this example the stochastic simulation process terminates when the percentage change, Pc, of the most probable prediction decreases to 0.5%.

Figure 6:
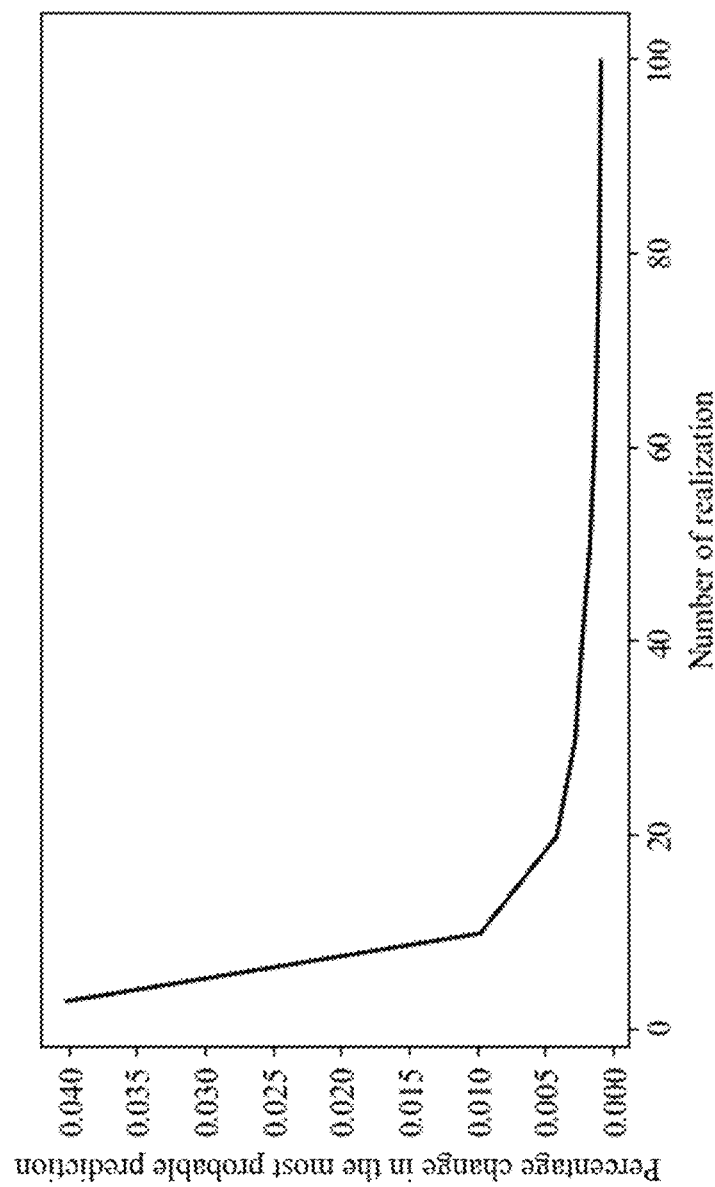
FIG. 6 is a graph showing a relationship between percentage change in the most probable prediction and the number of 3D realizations (up to 100) in one embodiment of the invention.

FIG. 6 shows the percentage change of the most probable prediction with every to realizations. It can be seen that the percentage change exhibits a monotonic decreasing trend and becomes less than 0.5% when the realization number increases beyond 20. In this example, 100 3D realizations are generated conditioning on a pair of perpendicular training images and 25 site-specific boreholes.

Figure 7A:
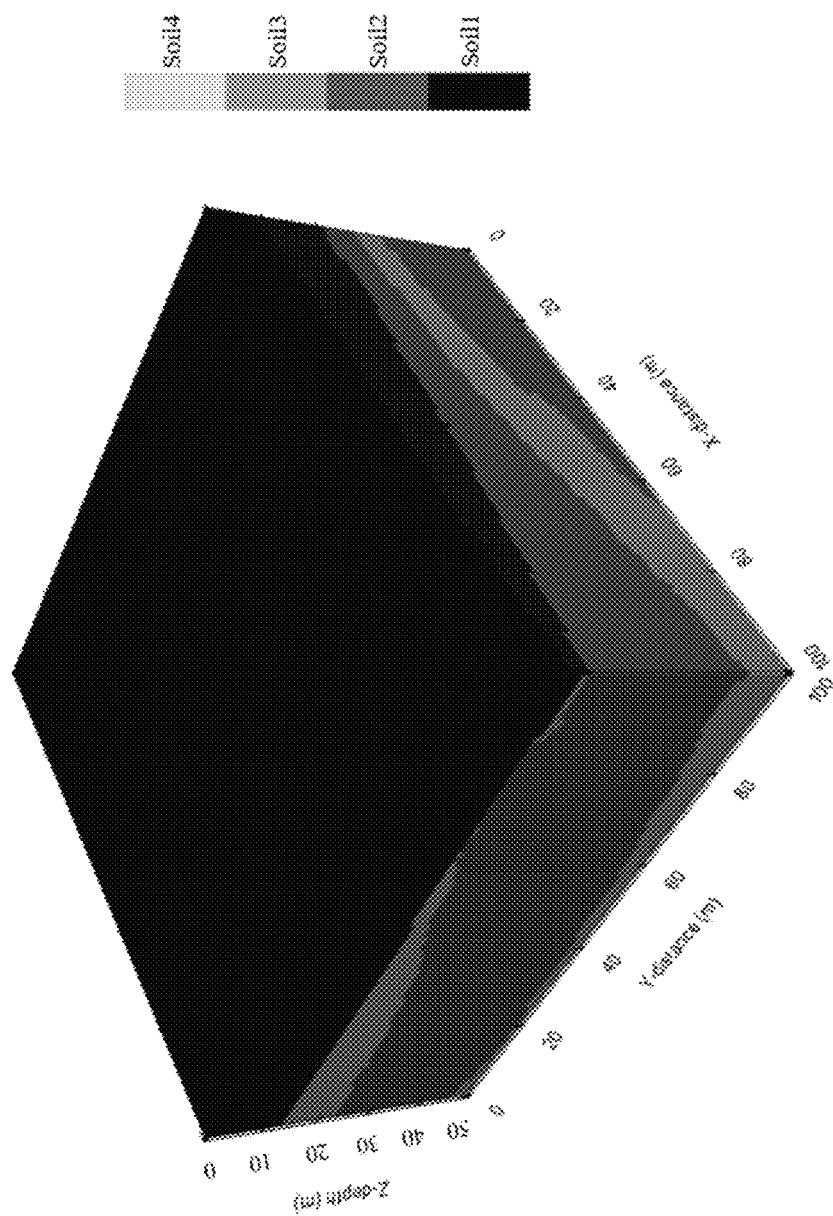
FIG. 7A is a plot illustrating the most probable 3D geological model derived from 100 3D realizations in one embodiment of the invention.
Figure 7B:
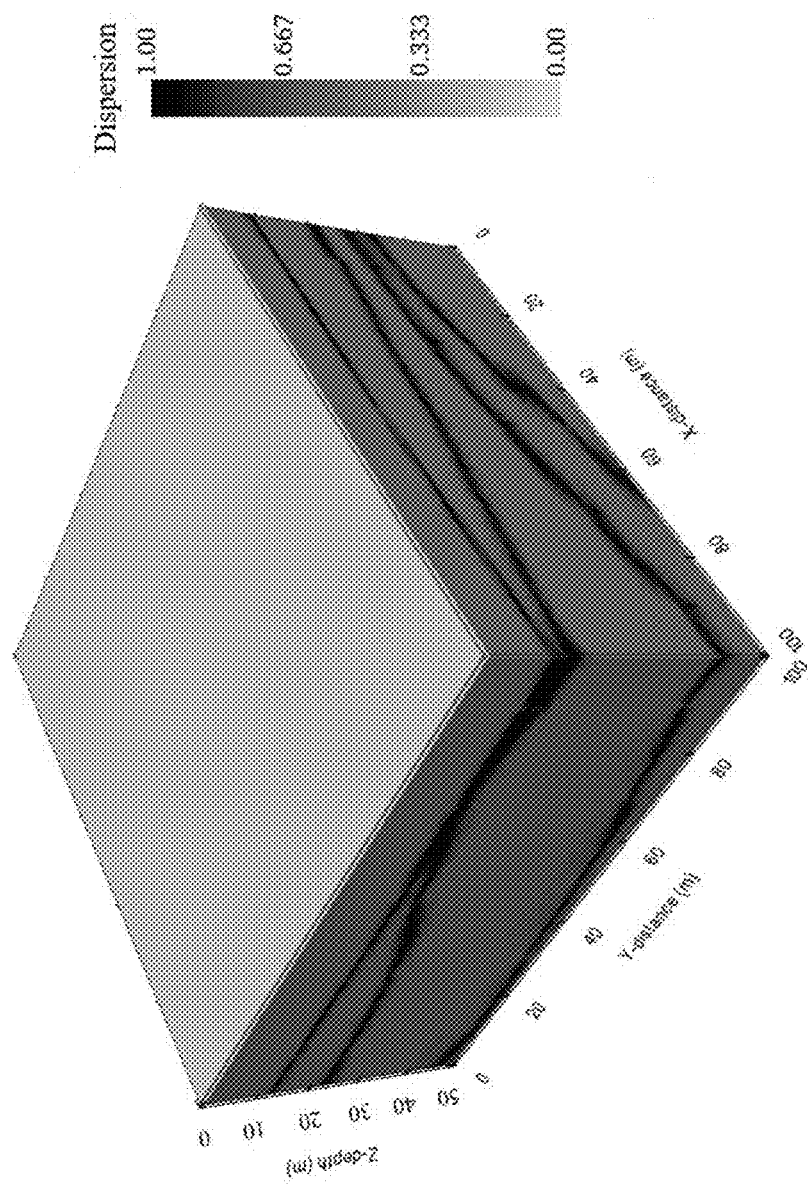
FIG. 7B is a plot illustrating the dispersion of the 100 3D realizations with respect to the most probable prediction in one embodiment of the invention.

FIGS. 7A and 7B show results of the method of this embodiment conditioning on 25 boreholes, with FIG. 7A illustrating the most probable 3D prediction and FIG. 7B showing the dispersion plot.

Specifically, FIG. 7A shows the most probable 3D geological model derived from the too realizations. The overall accuracy calculated using Equation (4) is 95.4%. The associated stratigraphic connectivity revealed from the three outer surfaces at X=100, Y=100 and Z=0 correctly replicates the true spatial patterns in FIG. 5B. The dispersion of the 100 3D realizations with respect to the most probable prediction is calculated using Equation (2). FIG. 7B illustrates the associated 3D dispersion plot. Note that bands of large dispersion values mainly concentrate around the predicted soil layer boundaries.

For this example, the true 3D geological domain is available. Thus, the prediction results are also compared with the ground truth 3D model.

Figure 8A:
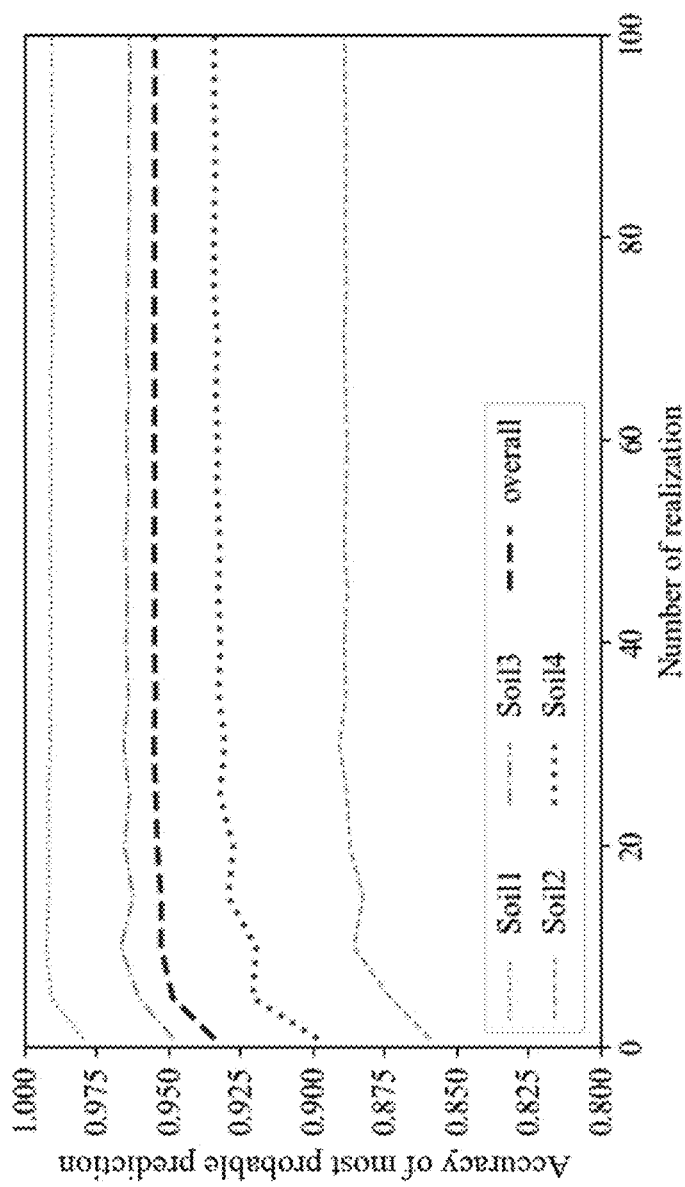
FIG. 8A is a graph showing a relationship between prediction accuracy of the most probable prediction (compared with true geological domain) and the number of 3D realizations (up to 100) for different soil types in one embodiment of the invention.
Figure 8B:
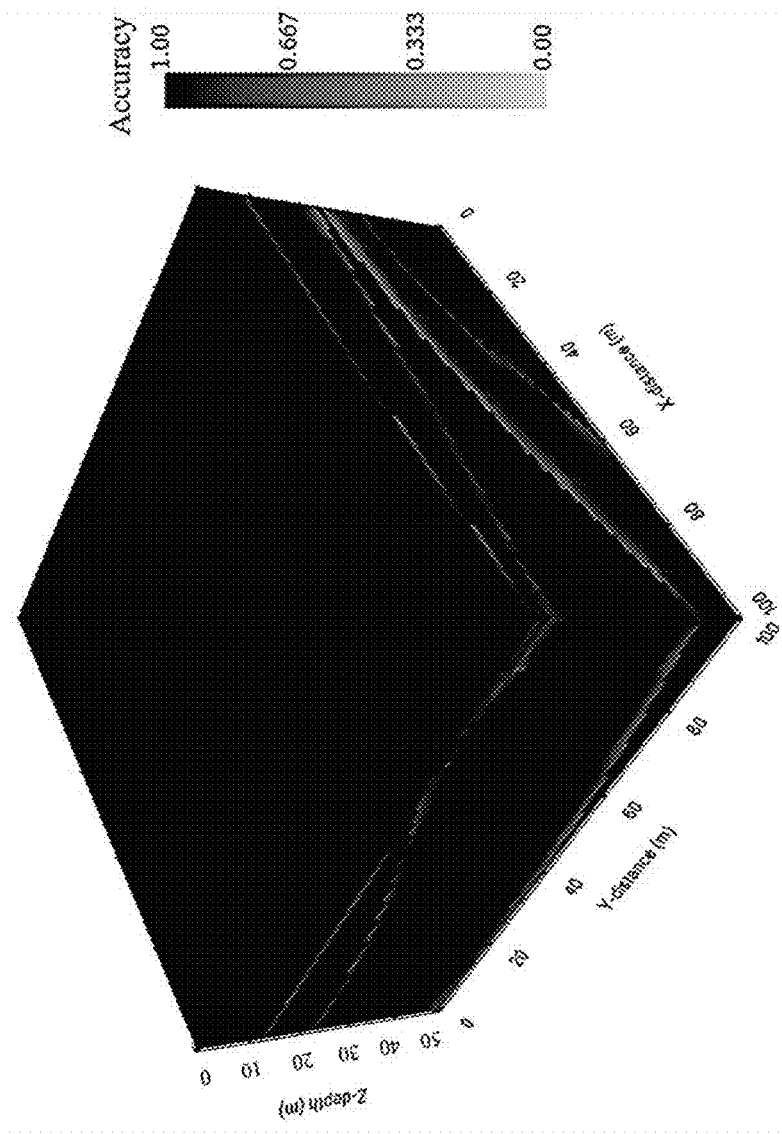
FIG. 8B is a plot illustrating the accuracy of the determined 3D geological model (compared with true geological domain)

FIGS. 8A and 8B illustrate the comparison between the most probable prediction results and true geological domain, with FIG. 8A illustrating variation of prediction accuracy of the most probable prediction results with realization number and FIG. 8B showing the accuracy plot.

Specifically, FIG. 8A shows the variation of prediction accuracy of different soil types with realization number. As shown in FIG. 8A, when the realization number is less than 40, there is a gradual increase in prediction accuracy of each soil type. Although all soil types have varied thickness and spatial connectivity, the prediction accuracy of soil2 remains the lowest among all four soil types irrespective of realization number. This is because the training stratigraphic patterns of soil2 are relatively limited in the training images as compared with those of other soil types. All the prediction accuracies generally stabilize when the realization number increases beyond 40.

FIG. 8B shows the accuracy of the 3D model calculated using Equation (4). It can be seen that areas of low accuracy, or large prediction errors, mainly concentrate around the true stratigraphic boundaries, which share similar spatial patterns as those revealed by dispersion plot in FIG. 7B. Based on the good correlation between dispersion and accuracy plots, it is possible to quantify the prediction uncertainty using the dispersion plot alone.

To facilitate comparison of results obtained using the method in this embodiment, three slices along each of X and Y directions are sampled.

FIGS. 9A to 9I show prediction results along selected slices at X=0, 10, and 40. Note that the slices (X=0, 40) does not contain any initial site-specific boreholes. In comparison, the slice at X=10 contains five boreholes, which is more informative than the other two slices. FIG. 9A shows the most probable prediction derived from 100 realizations at X=0. Although the result is obtained through both extrapolation and interpolation, an accuracy of about 94.3% is achieved based on Equation (4). Note that the true soil layer boundaries extracted at the same location in FIG. 5B have also been superimposed as dashed lines for comparison. Clearly, the most probable prediction reasonably captures the overall stratigraphic relationships. The dispersion plot in FIG. 9B indicates that the largest stratigraphic uncertainties mainly cluster around the true soil layer boundaries. For this example, the underlying ground truth geological cross-section is available. The accuracy plot in FIG. 9C indicates that most of the prediction errors fluctuate around the true soil layer boundaries, which is consistent with the dispersion results in FIG. 9B. The consistent results between dispersion and accuracy imply that the dispersion alone can be used to quantify associated prediction uncertainty. With respect to the slice at X=10, its most probable prediction (FIG. 9D) achieves the highest accuracy of 97.3% among all the three slices as it contains more site-specific boreholes than the other two slices. Areas of large dispersion (FIG. 9E) and low accuracy (or large prediction errors, FIG. 9F) mainly cluster around the true soil layer boundaries. For the most probable prediction at X=40 (FIG. 9G), an accuracy of 90.4% could be achieved. Note the central horizontal band of soil4 does not fully replicate the true stratigraphic connectivity. The prediction errors are reflected as high dispersion values in the dispersion plot in FIG. 9H. Essentially, the dispersion plot represents the confidence level of prediction using the method in this embodiment. The accuracy plot in FIG. 9I shares the similar stratigraphic patterns as those in the dispersion plot.

FIGS. 10A to 10I show prediction results along selected slices at Y=60, 90, and 100. Note that all the three most probable predictions have an accuracy of over 92%. The true soil layer boundaries have also been superimposed as dashed lines. Clearly, the stratigraphic relationships at the three slices (see FIGS. 10A, 10D and 10G) are correctly replicated by the method in this embodiment. Areas of large dispersion mainly cluster around the true soil layer boundaries (see FIGS. 10B, 10E and 10H). The accuracy plots in FIGS. 10C, 10F and 10I share the same spatial patterns as those in the corresponding dispersion plots, which further justifies the application of dispersion plot for uncertainty quantification.

A sensitivity analysis is further performed.

The 3D geo-modelling method in this embodiment relies on sequential development of 2D geological cross-sections using IC-XGBoost. The inventors of the invention have devised that, in some embodiments, four boreholes (borehole data) are considered sufficient for obtaining reasonable modelling results for a 2D geological cross-section discretized into a total of 100 to 150 grids in the horizontal direction. Thus, in some embodiments, the performance of the 3D modelling method may be reduced if any simulation slice contains less than 4 boreholes.

The effects of irregular borehole spacing and the number of training images on the 3D subsurface geological model obtained using the method in this embodiment are investigated.

Figure 11A:
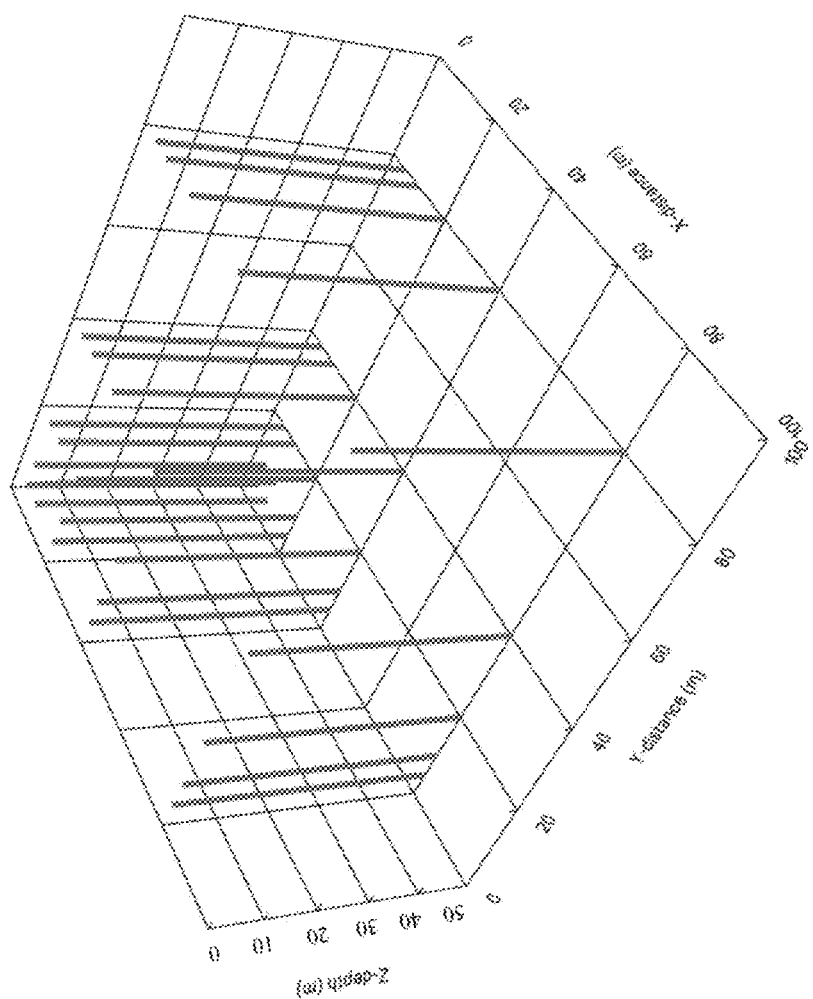
FIG. 11A is a plot illustrating 25 boreholes arranged unevenly in one embodiment of the invention.
Figure 11B:
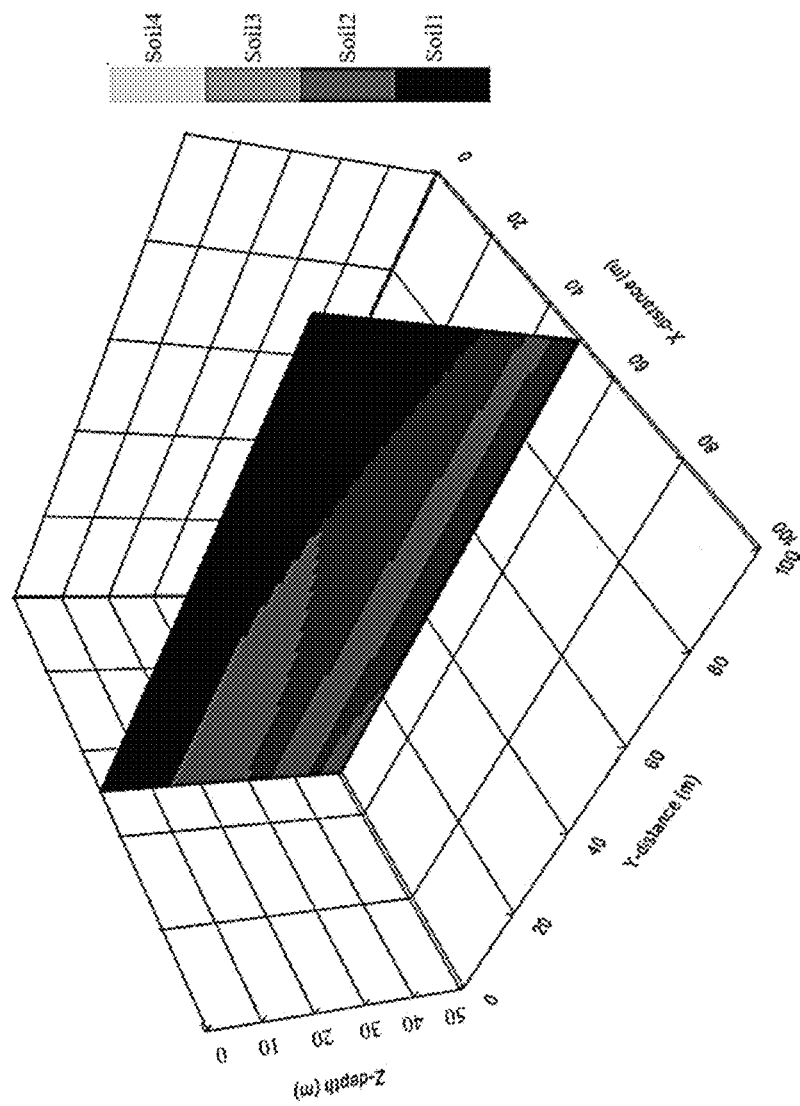
FIG. 11B is a plot illustrating a single training image extracted from the simulated 3D training geological domain of FIG. 5A in one embodiment of the invention.

FIGS. 11A and 11B illustrate the results of the sensitivity study using different combinations of training images and site-specific boreholes, with FIG. 11A showing a scenario with irregular borehole spacing and FIG. 11B showing a scenario with a single training image used in the method. The two perpendicular training images in the first scenario (see FIG. 11A) has the same locations as those in FIG. 5D but the spacing of site-specific boreholes varies between 5 m to 40 m, which is arranged in a geometric sequence, i.e., 5, 10, 20, 40, 80, along both X and Y directions. In comparison, the second scenario shown in FIG. 11B has the same number and locations of site-specific boreholes as those in FIG. 5E, but only one training image extracted from the training geological domain (see FIG. 5A) is used to reflect prior geological knowledge along both X and Y directions.

To investigate the effect of irregular borehole spacing on the method of the embodiment, 100 realizations are generated until the percentage change in the most probable prediction reduces to less than 0.5%.

FIGS. 12A to 12F illustrate the effects of irregular borehole spacing on the prediction results, in particular, comparison of prediction results conditioning on 25 boreholes with different spacing. For the ease of comparison, three slices (X=20, Y=20 and Z=5) are selected. FIG. 12A shows the most probable prediction when the 25 boreholes are of equal spacing. The most probable prediction results along the two vertical slices (X=20, Y=20) reasonably capture the spatial connectivity. The dispersion plot in FIG. 12B reveals that the stratigraphic variations mainly cluster around the predicted soil layer boundaries. Similarly, the accuracy plot in FIG. 12C shows a good correlation with the dispersion plot in FIG. 12B. FIG. 12D shows the most probable prediction conditioning on 25 irregularly spaced boreholes. For this Figure, the prediction accuracy calculated using Equation (4) is 91.6%, which is smaller than 95.4% in FIG. 12A. Note that as the borehole locations are arranged in a geometrical sequence with varied densities and only one borehole is located in the zone of X>40 m and Y>40 m (see FIG. 11A), accuracy of the predicted 3D geological model reduces, particularly in the zone with large borehole spacing (i.e., low borehole density). Due to a high density of borehole in the zone of X<40 m and Y<40 m, the stratigraphic connectivity within the two vertical slices (X=20, Y=20) are better constrained, and much finer stratigraphic patterns (i.e., small lens of soils4) can be reasonably predicted. The largest discrepancy occurs within the horizontal plane at Z=5, particularly close to the lateral boundary in intersection with X=100. This can be explained by the fact that the boundary line is deduced using extrapolation while conditioning on distant boreholes (e.g., with a separation of 20 m and 60 m), which leads to a prediction of soil types with high stratigraphic uncertainties. In addition, the large stratigraphic uncertainty propagates to areas close to external boundaries as internal areas close to the boundary line are interpolated conditioning on results extrapolated at the boundary line. At areas of low borehole density along Z=5 in FIG. 12D, the predicted soil layer boundaries (e.g., soil4) is not as smooth as those in FIG. 12A because of high stratigraphic uncertainties. Similar phenomenon is also observed in terms of dispersion plot (see FIG. 12E). With respect to the two vertical slices (X=20, Y=20), the bands of large dispersion are less concentrated particularly in the zone of X<40 m and Y<40 m because the stochastic simulations are better constrained by the high-density boreholes. In contrast, the dispersion distribution along the horizontal plane (Z=5) varies widely. Similar trends are also noted for the accuracy plot in FIG. 12F. The areas of low accuracy or large prediction errors are much wider in FIG. 12F, particular at areas close to the lateral model boundaries. Therefore, in some embodiments, the existence of some boreholes (hence availability of related borehole data) close to site boundary is beneficial during site investigation for mitigating potential stratigraphic errors propagation during development of 3D subsurface geological model.

FIGS. 13A to 13F illustrate the effects of using a single training image in the method on the prediction results. In this example a complete 3D geological domain is constructed conditioning on site-specific measurements and prior geological knowledge reflected in a single training image. Note that the ground condition in the illustrative example can be classified as "isotropic" as all the six stratigraphic connectivity patterns (i.e., soil1/soil2, soil1/soil4, soil2/soil3, soil2/soil4, soil3/soil4, and soil4/soil3) revealed in the existing site-specific measurements can find counterparts in the single training image in FIG. 11B. Therefore, the single training image is taken to contain typical stratigraphic relationships along both X and Y directions. Using the 3D modelling method of this embodiment, 100 3D realizations are generated. The associated most probable prediction, dispersion and accuracy are derived using Equations (2) and (3), respectively. FIGS. 13A-13C show the prediction results at three selected slices (X=0, Y=0 and Z=0) conditioning on a single training image and 25 site-specific boreholes.

The most probable prediction in FIG. 13A reasonably replicates the stratigraphic connectivity in FIG. 5B. The dispersion in FIG. 13B indicates the stratigraphic uncertainties mainly cluster around the predicted stratigraphic boundaries. Areas of large prediction uncertainty overlaps with those of low accuracy or large prediction errors in FIG. 13C. When only a single training image is combined with site-specific measurements for conditional simulation, the computed results are shown in FIGS. 13D to 13F. The most probable prediction in FIG. 13D achieves an accuracy of 93.8%, with is slightly smaller than 95.4% in FIG. 13A. In comparison, the dispersion and accuracy plots in FIGS. 13E and 13F show that areas of large dispersion and prediction errors are more diffusive than those in FIGS. 13B and 13C.

To further illustrate the performance, the computed results of three slices (Y=60, 90, 100) are extracted. It should be noted that the three slices are conditioning on a single training image and available site-specific boreholes.

FIGS. 14A to 14I show the prediction results along selected slices Y=60, 90, 100) using single training image (X=50). FIG. 14A shows the most probable prediction along Y=60. For better comparison, the true stratigraphic boundaries are also superimposed as dashed lines. Although an accuracy of 93.5% is obtained, the stratigraphic boundary of soil4 at a depth of 10 m to 20 m are not well restrained during the simulation. This can be explained by the fact that all the stratigraphic patterns are learned from a single training image rather than a paralleled training image. The dispersion in FIG. 14B shows that stratigraphic variations change wildly around the true stratigraphic boundaries. Areas of low accuracy or large prediction errors in FIG. 14C share similar patterns as that in FIG. 14B. The most probable prediction results along Y=90 and 100in FIGS. 14D and 14G have an accuracy of about 95.7% and 89.7%. Both accuracies are slightly smaller than those (96.8% and 92.4%) computed using a pair of perpendicular training images in FIGS. 10D and 10G. The dispersions in FIGS. 14E and 14H are more diffusive around the true soil boundaries. There is a good correlation between accuracy plots (FIGS. 14F and 14I) and dispersion plots (FIGS. 14E and 14H). It is worth mentioning that the 3D spatial distribution of stratigraphic patterns can reasonably be replicated even though a single training image is used for conditional simulation. This demonstrates feasibility of using a single training image for 3D geological modelling of isotropic ground conditions in some embodiments.

The above disclosure has provided, among other things, a 3D subsurface stratigraphic modelling and uncertainty quantification approach, IC-XGBoost3D, which can efficiently generate 3D subsurface geological model from sparse site-specific measurements and prior geological knowledge. In some implementations, the method relies on sequential simulations of 2D slices, which are subsequently reassembled into a complete 3D geological domain. In some implementations, the simulation of each 2D slice can be achieved using an enhanced machine learning algorithm called Iterative Convolution XGBoost (IC-XGBoost, e.g., 2D IC-XGBoost). In some implementations, potential stratigraphic connectivities are learned from a pair of perpendicular training images, which are the ensemble of believed (trusted) spatial statistics in the area of interest. In some implementations, the 3D subsurface geological modelling method is purely data-driven. The above results demonstrate that the method in the above embodiments of the invention can accurately reconstruct a 3D geological domain conditioning on a pair of training images (e.g., perpendicular) and limited site-specific boreholes. In some implementations, the method not only infers the most probable 3D subsurface geological model but also provides a quantitative evaluation of the associated 3D stratigraphic uncertainty.

Figure 15:
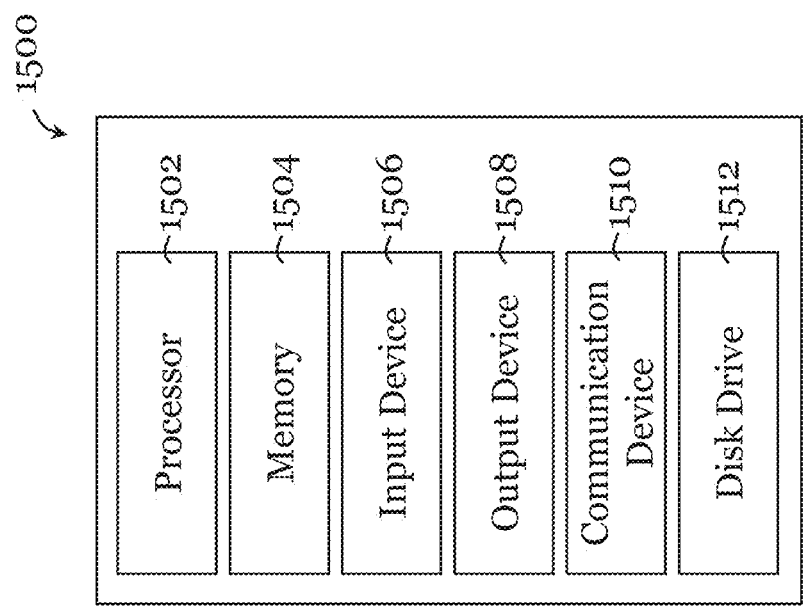
FIG. 15 is a functional block diagram of an example information handling system that can be used for performing one or more of the method embodiments of the invention.

FIG. 15 shows an example information handling system 1500 that can be used as a server or another type of information processing system in one embodiment of the invention. The information handling system 1500 can be used to perform one or more method embodiments (partly or entirely) of the invention. The information handling system 1500 generally comprises suitable components necessary to receive, store, and execute appropriate computer instructions, commands, and/or codes. The main components of the information handling system 1500 are a processor 1502 and a memory (storage) 1504. The processor 1502 may include one or more: CPU(s), MCU(s), logic circuit(s), Raspberry Pi chip(s), digital signal processor(s) (DSP), application-specific integrated circuit(s) (ASIC), field-programmable gate array(s) (FPGA), and/or any other digital or analog circuitry/circuitries configured to interpret and/or to execute program instructions and/or to process signals and/or information and/or data. The memory 1504 may include one or more volatile memory (such as RAM, DRAM, SRAM), one or more non-volatile memory (such as ROM, PROM, EPROM, EEPROM, FRAM, MRAM, FLASH, SSD, NAND, NVDIMM), or any of their combinations. Appropriate computer instructions, commands, codes, information and/or data may be stored in the memory 1504. Computer instructions for executing or facilitating executing the method embodiments of the invention may be stored in the memory 1504. The processor 1502 and memory (storage) 1504 may be integrated or separated (and operably connected). Optionally, the information handling system 1500 further includes one or more input devices 1506. Examples of such input device 1506 include: keyboard, mouse, stylus, image scanner, microphone, tactile/touch input device (e.g., touch sensitive screen), image/video input device (e.g., camera), etc. Optionally, the information handling system 1500 further includes one or more output devices 1508. Examples of such output device 1508 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The information handling system 1500 may further include one or more disk drives 1512 which may include one or more of: solid state drive, hard disk drive, optical drive, flash drive, magnetic tape drive, etc. A suitable operating system may be installed in the information handling system 1500, e.g., on the disk drive 1512 or in the memory 1504. The memory 1504 and the disk drive 1512 may be operated by the processor 1502. Optionally, the information handling system 1500 also includes a communication device 1510 for establishing one or more communication links (not shown) with one or more other computing devices such as servers, personal computers, terminals, tablets, phones, watches, IoT devices, or other wireless computing devices. The communication device 1510 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1502, the memory 1504 (optionally the input device(s) 1506, the output device(s) 1508, the communication device(s) 1510 and the disk drive(s) 1512, if present) are connected with each other, directly or indirectly, through a bus, a Peripheral Component Interconnect (PCI) such as PCI Express, a Universal Serial Bus (USB), an optical bus, or other like bus structure. In one embodiment, at least some of these components may be connected wirelessly, e.g., through a network such as the Internet or a cloud computing network. A person skilled in the art would appreciate that the information handling system 1500 shown in FIG. 15 is merely an example and that the information handling system 1500 can in other embodiments have different configurations (e.g., include additional components, has fewer components, etc.).

In some implementations, the method of the invention can be integrated with or implemented on a computer-implemented geographic information platform such as a geographic information system (GIS) platform. The computer-implemented geographic information platform may be operated as an application (desktop, mobile APP, web APP, etc.).

Figure 17:
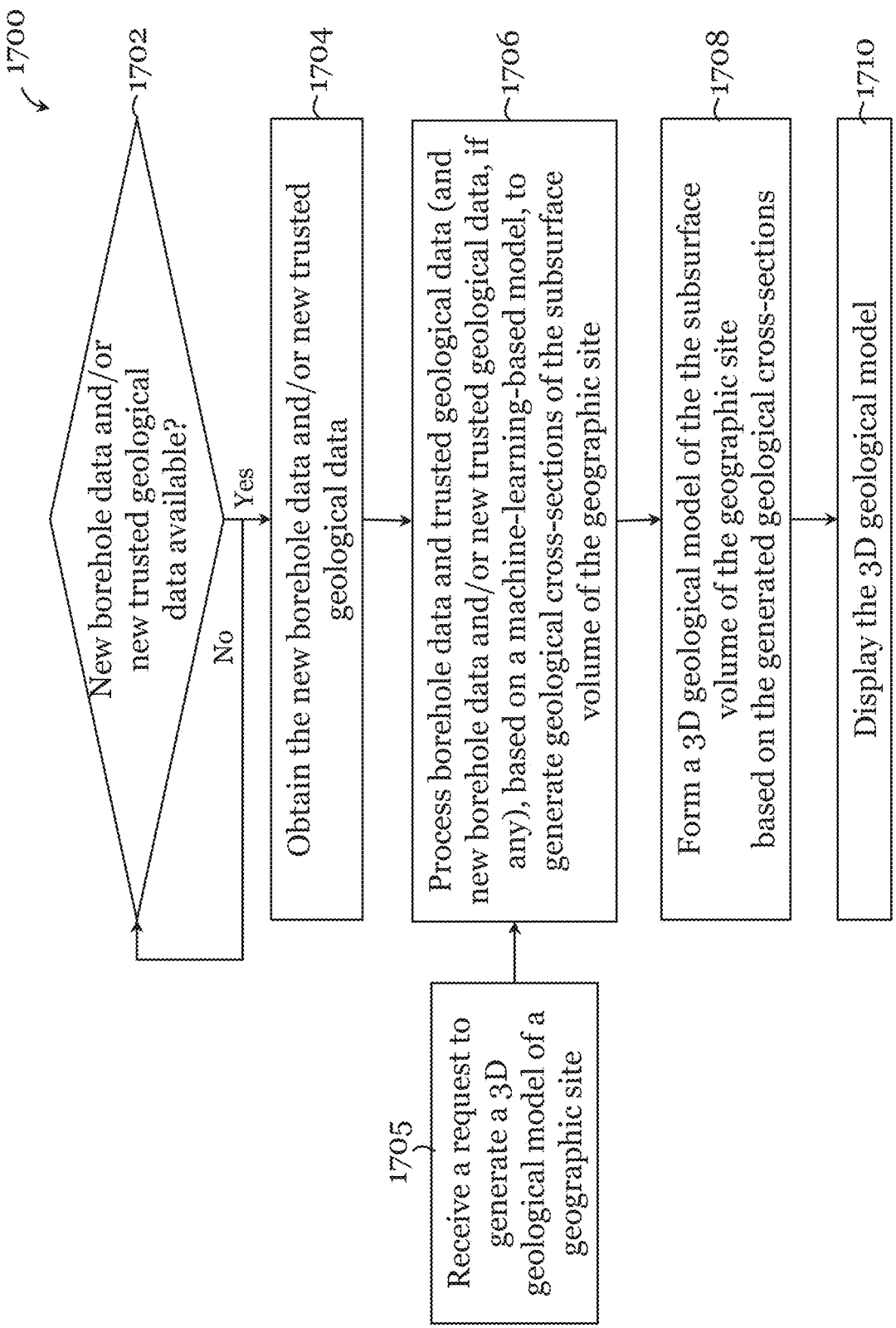
FIG. 17 is a flowchart illustrating a method for operating a computer-implemented geographic information platform in one embodiment of the invention.

FIG. 17 shows a method 1700 for operating a geographic information platform in one embodiment of the invention. The method 1700 may be implemented using suitable hardware and software. The geographic information platform may be implemented using suitable hardware and/or software. The method 1700 can be considered as the method 1600 implemented on or with a geographic information platform. Thus, steps 1706, 1708, and 1710 in method 1700 generally correspond to respective steps 1602, 1604, and 1606 in method 1600.

In method 1700, step 1702, a determination is made as to whether new borehole data and/or new trusted geological data is available. This determination can be performed by an information handling system that operates the geographic information platform. This determination can be performed automatically. In one example, new borehole data and/or new trusted geological data is uploaded, transmitted, inputted, etc., to the information handling system or another system operably coupled with the information handling system, and the determination may be performed by actively monitoring for such input or based on a notification received or retrieved in relation to the new data availability. If it is determined that no new borehole data and new trusted geological data is available, the method 1700 stops or maintains at step 1702 to monitor for availability of new data. If it is determined that new data is available, then the method 1700 proceeds to step 1704 to obtain the new borehole data and/or new trusted geological data (whichever is available). The obtained new data can be stored in a memory, storage, database, server, etc., for subsequent use.

Figure 18:
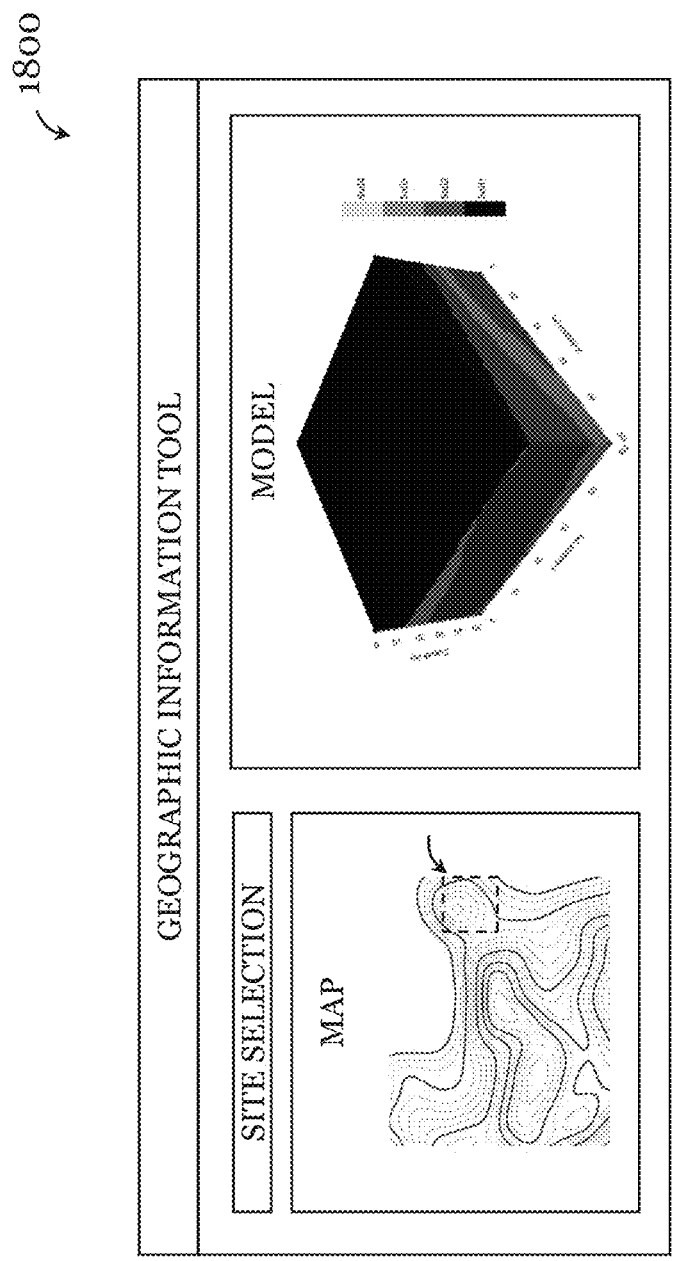
FIG. 18 is a screenshot of a user interface of a computer-implemented geographic information platform in one embodiment of the invention.

In step 1705, the information handling system or the geographic information platform receives, via a user interface, a request to generate a 3D geological model of a geographic site. If the request is received, the method 1700 proceeds to step 1706, to generate geological cross-sections of the subsurface volume of the geographic site using the borehole data and trusted geological data (including the new borehole data and/or new trusted geological data obtained in step 1704, if any). Details of step 1706 are generally the same as step 1602 in method 1600 hence are not repeated here. Likewise, detailed of steps 1708 and 1710 are generally the same as steps 1604 and 1606 in method 1600 hence are not repeated here. The generated 3D geological model in step 1710 is presented to the user via the user interface of the geographic information platform. FIG. 18 shows an example user interface 1800 of the geographic information platform.

In one embodiment, if new borehole data and/or new trusted geological data is available and is obtained while the 3D geological model is being formed or displayed, the 3D geological model gets updated based on the new data. In one embodiment, the 3D geological model may thus be dynamically updated automatically.

The above embodiments of the invention possess one or more unique features. For example, some embodiments of the method bypass the need of a 3D training image, which is required in some existing methods of 3D geological modelling, and hence tackles the challenge that 3D training image does not exist in geological or geotechnical applications. For example, some embodiments of the method construct a 3D geological domain by sequentially generating 2D geological cross-sections conditioning on 2D training images and site-specific borehole data and reassembling them into a 3D point cloud. The simulation sequence is established based on the principle that each current 2D vertical slice contains as many conditioning data as possible. The conditioning data includes both original site-specific boreholes and results obtained from previous simulation steps. For example, in some embodiments, the trusted stratigraphic statistics (taken as "truth") can be concisely and implicitly stored in a pair of perpendicular 2D training images, which reveal potential horizontal anisotropy and can be obtained from previous projects with similar geological settings. With the sequential prediction at unsampled locations, a 3D representation of the subsurface geology is generated.

For example, in some embodiments of the method, the sequential simulation of each 2D vertical slice is performed using an enhanced IC-XGBoost algorithm ("IC-XGBoost3D") with improved capacity and computational efficiency. The 2D IC-XGBoost algorithm, developed by the inventors previously, relies on a simulation template (i.e., a 3×3 cell grid with unknown cells lying along the central column) for stratigraphic feature extraction from 2D training images and onward spatial interpolation. Because of the template, the 2D IC-XGBoost algorithm cannot be used for extrapolation. In IC-XGBoost3D, one enhancement is the incorporation of extrapolation when no site-specific boreholes are available along model boundaries, a situation often encountered in engineering practice. A new simulation template with unknown cells lying along the side columns is designed for pattern extraction and extrapolation. The extrapolation prediction of model boundary is performed first whenever there are no site-specific boreholes along model boundaries. After extrapolation, the delineation of unsampled locations within a 2D geological cross-section or spatial interpolation is conducted using a 2D IC-XGBoost algorithm. Another enhancement is the determination of all the multi-scale simulation templates of varied sizes that are amenable to the simulation slice at the start of simulation. The collected multi-scale templates are applied to exhaust all the stratigraphic patterns embedded in 2D training images. All the extracted spatial statistics are used to pre-train a XGBoost model, which is consecutively used for the sequential delineation of 2D vertical slices. In some embodiments, the implementation of the pre-training strategy can significantly improve the simulation efficiency for the delineation of a single 2D vertical slice. This can be important for development of 3D subsurface geological models using IC-XGBoost3D because a large number of 2D simulations is performed and needed for assembling a 3D model.

Some embodiments of the invention can provide an automatic method for 3D subsurface stratigraphic modelling and uncertainty quantification, which are beneficial for building and updating 3D geological models of an underground digital twin conditioning on limited site-specific boreholes and 2D training images reflecting prior geological knowledge. The modelling of a 3D geological domain may comprise sequential simulations of many 2D vertical slices following a random simulation path and reassembly into a complete 3D geological domain. The stratigraphic uncertainty may be quantified via statistical analysis of multiple equiprobable 3D geological realizations generated under a framework of Monte Carlo simulation. The 2D training images may utilize existing 2D geological cross-sections from nearby sites or previous projects with similar geological settings. The random 2D simulation sequence may be determined based on the principle that each current vertical slice contains the largest number of site-specific data, and a random draw is conducted if there exist over two or more simulation slices containing the same number of site-specific data. The prediction of 2D simulation slice may be carried out using an enhanced 2D IC-XGBoost algorithm called IC-XGBoost3D. The conditioning data for simulating a 2D vertical slice may include both existing site-specific boreholes and simulation results from previous simulation results. The IC-XGBoost3D algorithm may enable extrapolation prediction and may implement a pre-training strategy for achieving computational efficiency required for 3D modelling. The extrapolation prediction may be always carried out ahead of interpolation prediction if there are unsampled points along boundaries of a 3D geological model. A pre-training strategy may be implemented by determining all the multi-scale templates (i.e., 3×3 cell grids) based on site-specific borehole data, followed by applying it to exhaust all the stratigraphic relationships embedded in training images for training a classification algorithm (i.e., a XGBoost or multilayer perceptron).

Example functions of some embodiments of the invention include reconstructing or constructing 3D subsurface geological models from sparse site-specific boreholes and 2D training images reflecting prior geological knowledge. Some embodiments of the invention can be applied to build and dynamically update 3D subsurface geological domains in a digital twin of subsurface critical infrastructures for smart city applications. Over the past decade, different cities around the world have set specific strategies to promote smart city development. One task for developing a smart city is establishment of a 3D digital twin, which is virtual representations of 3D physical entities in the real world. A digital twin can help practitioners streamline the design, construction and performance monitoring and maintenance of underground infrastructures. Therefore, it is desirable to have an efficient method to determine accurately the 3D subsurface stratigraphy and evaluate quantitatively the associated stratigraphic uncertainty involved in the underground digital twin. The method and 3D geological models in some embodiments of the invention can be used in combination with Internet-of-Thing (IoT) technologies for real-time monitoring of civil construction process for data-driven engineering analysis and decision-making. The method of the invention can be packaged and coded, e.g., in a Python package, and/or incorporated into or otherwise applied to a geographic information system (GIS) platform, e.g., Arc-GIS.

Some embodiments of the invention may include one or more of the following advantages. First, some embodiments take advantage of valuable prior geological knowledge, which is normally ignored in traditional statistical methods, and represents it in 2D training images. Second, some embodiments reply on an image-based stochastic simulation framework to infer the best estimate of a 3D subsurface geological domain conditioning on 2D training images and site-specific data and quantify associated stratigraphic uncertainty in a data-driven manner. For traditional statistical methods such as Markov-based models (e.g., hidden Markov Chain and Markov Random Field), parametric function forms for distributions of governing parameters have to be specified in advance. For these traditional statistical methods, the specification and determination of associated parameters are challenging when only limited site-specific measurements are available. Current engineering practices rely heavily on engineering judgement for hand/manual digitalization of a 3D subsurface geological domain for engineering analysis and design. Some embodiments can help contractors and designers to build an underground digital twin of subsurface critical civil infrastructures for smart geotechnical site investigation, geotechnical design, analysis of construction site, etc.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive. Example optional features of some aspects of the invention are set forth in the summary section above. Some embodiments of the invention may include one or more of these optional features (some of which are not specifically illustrated in the drawings). Some embodiments of the invention may lack one or more of these optional features (some of which are not specifically illustrated in the drawings). One or more features in one embodiment and one or more features in another embodiment may be combined to provide further embodiment(s) of the invention.

The invention claimed is:

1. A computer-implemented method for generating a 3D geological model of a subsurface volume of a geographic site, comprising:
processing, based on a machine-learning-based model,
(a) borehole data of a plurality of boreholes at the geographic site, the borehole data including data related to subsurface soil and/or rock information along at least part of each of the plurality of boreholes, and
(b) trusted geological data associated with the geographic site, wherein the trusted geological data includes data related to prior stratigraphic information associated with the geographic site that is representable as one or more 2D images of stratigraphic pattern associated with the geographic site,
to generate a plurality of geological cross-sections of the subsurface volume of the geographic site, each the plurality of geological cross-sections containing respective stratigraphic information;
applying the borehole data and the trusted geological data to a 3D coordinate system;
sequentially processing a plurality of slices for the subsurface volume in the 3D coordinate system based on the machine-learning-based model, to consecutively generate the plurality of geological cross-sections; and
forming the 3D geological model based on the generated geological cross-sections for display.

2. The computer-implemented method of claim 1, wherein the machine-learning-based model comprises a gradient boosting based algorithm.

3. The computer-implemented method of claim 1, wherein the data related to prior stratigraphic information associated with the geographic site comprises data related to stratigraphic information of another site nearby the geographic site and/or another site that is geologically-similar to the geographic site.

4. The computer-implemented method of claim 1, wherein the machine-learning-based model is trained based on the one or more 2D images.

5. The computer-implemented method of claim 1,
wherein the one or more 2D images consist of a single 2D image; and
wherein applying the borehole data and the trusted geological data to a 3D coordinate system comprises:
arranging the borehole data along a depth direction in the 3D coordinate system; and
arranging the single 2D image to extend along the depth direction in the 3D coordinate system.

6. The computer-implemented method of claim 1,
wherein the one or more 2D images comprise two 2D images; and
wherein applying the borehole data and the trusted geological data to a 3D coordinate system comprises:
arranging the borehole data along a depth direction in the 3D coordinate system; and
arranging the two 2D images such that they both extend along the depth direction in the 3D coordinate system and such that respective imaginary planes containing the two 2D images define a dihedral angle in the 3D coordinate system.

7. The computer-implemented method of claim 6, wherein the dihedral angle is about 90 degrees.

8. The computer-implemented method of claim 6, wherein the plurality of slices comprises:
a first plurality of slices arranged generally in parallel with each other and with one of the two 2D images; and
a second plurality of slices arranged generally in parallel with each other and with another one of the two 2D images; and
the first plurality of slices are not arranged parallel to the second plurality of slices.

9. The computer-implemented method of claim 8, wherein the processing further comprises:
identifying a slice containing largest amount of borehole data;
initially processing the slice containing the largest amount of borehole data based on the machine-learning-based model; and
then,
(i) if the slice first processed is one of the first plurality of slices, alternately processing one second plurality of slices and one first plurality of slices based on the machine-learning-based model until all of the plurality of slices are processed; and
(ii) if the slice first processed is one of the second plurality of slices, alternately processing one first plurality of slices and one second plurality of slices based on the machine-learning-based model until all of the plurality of slices are processed.

10. The computer-implemented method of claim 9, wherein the generated geological cross-section of a processed slice is used as additional borehole data in the processing of the next slice.

11. The computer-implemented method of claim 10, wherein the sequentially processing comprises:
first processing the slice containing the largest amount of borehole data; and
then sequentially processing the remaining slices in the order of decreasing amount of borehole data and additional borehole data contained in the slices, until all the slices have been processed.

12. The computer-implemented method of claim 11, wherein the sequentially processing comprises:
if two or more of the remaining slices contain the same amount of borehole data and additional borehole data, randomly selecting one of the two or more slices for processing.

13. The computer-implemented method of claim 1, wherein the processing of each of the plurality of slices comprises, for each slice:
performing an extrapolation operation based on the machine-learning-based model to determine stratigraphic information for a boundary of the slice if no borehole data is present along a boundary of the slice; and
performing an interpolation operation based on the machine-learning-based model to determine stratigraphic information for other parts of the slice with no borehole data.

14. The computer-implemented method of claim 13, wherein the performing of the extrapolation operation comprises:
determining a template based on the borehole data contained in the slice, the template including a plurality of spaced-apart columns of cells parallel to a depth direction, the columns including a first column along a set of borehole data, a second column along another set of borehole data, and a third column along the boundary without borehole data for extrapolation;
applying the template to the 2D image parallel to the slice to extract stratigraphic relationships and/or statistics;
training the machine-learning-based model using the extracted stratigraphic relationships and/or statistics; and
applying the template to the slice along one or more paths to iteratively process the slice based on the trained machine-learning-based model to determine stratigraphic information for the boundary.

15. The computer-implemented method of claim 13, wherein the performing of the interpolation operation comprises:
determining a plurality of templates based on the borehole data contained in the slice, each of the templates including respective plurality of spaced-apart columns of cells parallel to a depth direction, the columns including a respective first column along a respective set of borehole data, a respective second column along another respective set of borehole data, and a third column in a space between the first and second columns and without borehole data for interpolation;
applying the templates to the 2D image parallel to the slice to extract stratigraphic relationships and/or statistics;
training the machine-learning-based model using the extracted stratigraphic relationships and/or statistics; and
applying the templates to the slice along one or more paths to iteratively process the slice based on the trained machine-learning-based model to determine stratigraphic information for other parts of the slice with no borehole data.

16. The computer-implemented method of claim 1, further comprising: displaying the 3D geological model.

17. A computer-implemented method for generating a 3D geological model of a subsurface volume of a geographic site, comprising:
processing, based on a machine-learning-based model,
(a) borehole data of a plurality of boreholes at the geographic site, the borehole data including data related to subsurface soil and/or rock information along at least part of each of the plurality of boreholes, and
(b) trusted geological data associated with the geographic site, wherein the trusted geological data including data related to prior stratigraphic information associated with the geographic site,
to generate a plurality of geological cross-sections of the subsurface volume of the geographic site, each the plurality of geological cross-sections containing respective stratigraphic information;
forming the 3D geological model based on the generated geological cross-sections for display, wherein the 3D geological model comprises a 3D point cloud, each point in the 3D point cloud containing subsurface soil and/or rock information modelled as a categorical variable; and
quantifying stratigraphic uncertainty associated with the 3D model, which comprises, for each point in the 3D point cloud, determining a value indicative of a confidence level associated with the subsurface soil and/or rock information contained in the point.

18. The computer-implemented method of claim 17, wherein quantifying stratigraphic uncertainty associated with the 3D model comprises:
performing statistical analysis of multiple equiprobable 3D geological realizations generated based on Monte Carlo simulation.

19. A system for generating a 3D geological model of a subsurface volume of a geographic site, comprising:
one or more processors; and
memory storing one or more programs configured to be executed by the one or more processors, the one or more programs including instructions for:
processing, based on a machine-learning-based model,
(i) borehole data of a plurality of boreholes at the geographic site, the borehole data including data related to subsurface soil and/or rock information along at least part of each of the plurality of boreholes, and
(ii) trusted geological data associated with the geographic site, wherein the trusted geological data includes data related to prior stratigraphic information associated with the geographic site that is representable as one or more 2D images of stratigraphic pattern associated with the geographic site,
to generate a plurality of geological cross-sections of the subsurface volume of the geographic site, each the plurality of geological cross-sections containing respective stratigraphic information;

applying the borehole data and the trusted geological data to a 3D coordinate system;

sequentially processing a plurality of slices for the subsurface volume in the 3D coordinate system based on the machine-learning-based model, to consecutively generate the plurality of geological cross-sections; and forming the 3D geological model based on the generated geological cross-sections for display.

20. A non-transitory computer-readable storage medium storing one or more programs configured to be executed by one or more processors, the one or more programs including instructions for performing a method for generating a 3D geological model of a subsurface volume of a geographic site, which includes:

processing, based on a machine-learning-based model,
  (i) borehole data of a plurality of boreholes at the geographic site, the borehole data including data related to subsurface soil and/or rock information along at least part of each of the plurality of boreholes, and
  (ii) trusted geological data associated with the geographic site, wherein the trusted geological data includes data related to prior stratigraphic information associated with the geographic site that is representable as one or more 2D images of stratigraphic pattern associated with the geographic site, to generate a plurality of geological cross-sections of the subsurface volume of the geographic site, each the plurality of geological cross-sections containing respective stratigraphic information;

applying the borehole data and the trusted geological data to a 3D coordinate system;

sequentially processing a plurality of slices for the subsurface volume in the 3D coordinate system based on the machine-learning-based model, to consecutively generate the plurality of geological cross-sections; and forming the 3D geological model based on the generated geological cross-sections for display.

\* \* \* \* \*